US009767460B2

(12) United States Patent
Koretz

(10) Patent No.: US 9,767,460 B2
(45) Date of Patent: Sep. 19, 2017

(54) METHODS FOR INTEGRATING REVENUE GENERATING FEATURES WITHIN A SOFTWARE APPLICATION AND SYSTEMS THEREOF

(75) Inventor: David A. Koretz, Rochester, NY (US)

(73) Assignee: Adventive, Inc., Rochester, NY (US)

( * ) Notice: Subject to any disclaimer, the term of this patent is extended or adjusted under 35 U.S.C. 154(b) by 1357 days.

(21) Appl. No.: 11/522,724

(22) Filed: Sep. 18, 2006

(65) Prior Publication Data
US 2008/0072067 A1 Mar. 20, 2008

(51) Int. Cl.
G06Q 30/00 (2012.01)
G06Q 30/02 (2012.01)

(52) U.S. Cl.
CPC .................................. *G06Q 30/02* (2013.01)

(58) Field of Classification Search
USPC ........................................................... 705/14
See application file for complete search history.

(56) References Cited

U.S. PATENT DOCUMENTS

| | | | |
|---|---|---|---|
| 5,101,425 A | 3/1992 | Darland et al. |
| 5,210,789 A | 5/1993 | Jeffus et al. |
| 5,442,707 A | 8/1995 | Miyaji et al. |
| 5,509,074 A | 4/1996 | Choudhury et al. |
| 5,551,030 A | 8/1996 | Linden et al. |
| 5,615,268 A | 3/1997 | Bisbee et al. |
| 5,617,114 A | 4/1997 | Bier et al. |
| 5,640,577 A | 6/1997 | Scharmer |
| 5,694,563 A | 12/1997 | Belfiore et al. |
| 5,727,057 A | 3/1998 | Emery et al. |
| 5,737,424 A | 4/1998 | Elteto et al. |
| 5,774,668 A | 6/1998 | Choquier et al. |
| 5,790,790 A | 8/1998 | Smith et al. |
| 5,790,793 A | 8/1998 | Higley |
| 5,794,207 A | 8/1998 | Walker et al. |
| 5,794,259 A | 8/1998 | Kikinis |
| 5,802,518 A | 9/1998 | Karacy et al. |

(Continued)

OTHER PUBLICATIONS

Koretz, "Featuretisements!?!?" (Copyright ©2003-2005) at http://dkoretz.typepad.com/rants/2006/06/featuretisement.html.

(Continued)

*Primary Examiner* — Alvin L Brown
(74) *Attorney, Agent, or Firm* — LeClairRyan, a Professional Corporation

(57) ABSTRACT

A method and system for generating revenue within an application includes determining when at least one of stored data associated with a user of an application, input data entered by the user of the application, and an action by the user of the application corresponds with at least one transactional feature embedded in the at least one application, a first source is associated with the application and a second source is associated with the transactional feature. A first source is associated with the application and a second source is associated with the transactional feature. The transactional feature is provided without leaving the application to the user when the determining determines at least one of the stored data, the input data, and the action corresponds with the transactional feature. At least one selection of one of one or more transaction options from the transactional feature is received and revenue is provided to the first source based on the received selection.

36 Claims, 21 Drawing Sheets

(56) References Cited

U.S. PATENT DOCUMENTS

| | | |
|---|---|---|
| 5,805,811 A | 9/1998 | Pratt et al. |
| 5,835,896 A | 11/1998 | Fisher et al. |
| 5,845,281 A | 12/1998 | Benson et al. |
| 5,848,131 A | 12/1998 | Shaffer et al. |
| 5,848,161 A | 12/1998 | Luneau et al. |
| 5,870,470 A | 2/1999 | Johnson et al. |
| 5,870,544 A | 2/1999 | Curtis |
| 5,875,296 A | 2/1999 | Shi et al. |
| 5,890,138 A | 3/1999 | Godin et al. |
| 5,893,118 A | 4/1999 | Sonderegger |
| 5,895,454 A | 4/1999 | Harrington |
| 5,897,622 A | 4/1999 | Blinn et al. |
| 5,899,980 A | 5/1999 | Wilf et al. |
| 5,905,973 A | 5/1999 | Yonezawa et al. |
| 5,917,491 A | 6/1999 | Bauersfeld |
| 5,940,807 A | 8/1999 | Purcell |
| 5,946,665 A | 8/1999 | Suzuki et al. |
| 5,956,709 A | 9/1999 | Xue |
| 5,960,411 A | 9/1999 | Hartman et al. |
| 5,963,949 A | 10/1999 | Gupta et al. |
| 5,970,475 A | 10/1999 | Barnes et al. |
| 5,974,441 A | 10/1999 | Rogers et al. |
| 5,987,425 A | 11/1999 | Hartman et al. |
| 5,991,740 A | 11/1999 | Messer |
| 5,999,914 A | 12/1999 | Blinn et al. |
| 5,999,938 A | 12/1999 | Bliss et al. |
| 6,006,332 A | 12/1999 | Rabne et al. |
| 6,058,417 A | 5/2000 | Hess et al. |
| 6,065,046 A | 5/2000 | Feinberg et al. |
| 6,219,669 B1 | 4/2001 | Haff et al. |
| 6,269,135 B1 | 7/2001 | Sander |
| 6,359,840 B1 | 3/2002 | Evans |
| 6,598,027 B1 | 7/2003 | Breen et al. |
| 6,647,370 B1 | 11/2003 | Fu et al. |
| 6,658,473 B1 | 12/2003 | Block et al. |
| 6,879,691 B1 | 4/2005 | Koretz |
| 6,938,256 B2 | 8/2005 | Deng et al. |
| 6,986,076 B1 | 1/2006 | Smith et al. |
| 6,993,572 B2 | 1/2006 | Ross, Jr. et al. |
| 2003/0135507 A1 | 7/2003 | Hind et al. |
| 2004/0010451 A1* | 1/2004 | Romano et al. ............... 705/26 |
| 2004/0139154 A1 | 7/2004 | Schwarze |
| 2005/0044003 A1* | 2/2005 | O'Keeffe et al. ............... 705/26 |
| 2005/0097204 A1* | 5/2005 | Horowitz et al. ............ 709/223 |
| 2005/0204367 A1 | 9/2005 | Minium, Jr. et al. |
| 2005/0223392 A1 | 10/2005 | Cox et al. |
| 2006/0020950 A1 | 1/2006 | Ladd et al. |
| 2007/0073585 A1* | 3/2007 | Apple et al. .................... 705/14 |
| 2007/0168871 A1* | 7/2007 | Jenkins ........................ 715/751 |
| 2007/0198432 A1 | 8/2007 | Pitroda et al. |
| 2007/0233556 A1* | 10/2007 | Koningstein .................. 705/14 |
| 2007/0240029 A1 | 10/2007 | Kitada et al. |
| 2010/0017874 A1 | 1/2010 | Piccinini et al. |
| 2011/0064207 A1* | 3/2011 | Chiu et al. ................. 379/88.22 |

OTHER PUBLICATIONS

Miller, Michael "The Complete Idiot's Guide to Online Auctions," (1999).
BuyTextiles.com (http://www.ecompartners.com/buytextiles/htm/listing_help.htm), 1-4 (1999).
David Koretz.com (http://dkoretz.typepad.com/rants/2006/06/featuretisement.html), 1-3.
International Search Report for International Patent Application No. PCT/US07/71521, Jan. 7, 2008.
International Search Report for International Patent Application No. PCT/US07/71524, Jul. 15, 2008.
International Search Report for International Patent Application No. PCT/US07/71525, Aug. 27, 2008.
International Search Report for International Patent Application No. PCT/US09/35127, Apr. 13, 2009.
Written Opinion of the International Searching Authority for International Patent Application No. PCT/US09/35127, Apr. 3, 2009.

* cited by examiner

FIG. 3C

METHODS FOR INTEGRATING REVENUE GENERATING FEATURES WITHIN A SOFTWARE APPLICATION AND SYSTEMS THEREOF

FIELD OF THE INVENTION

This invention generally relates to advertising systems and methods thereof and, more particularly, to transactional advertising in Web-based software applications and methods thereof.

BACKGROUND

In the emerging Software as a Service ("SaaS") market, many companies give their application away for free to the end-user and monetize the application with advertising revenue from third-party advertisers. There are currently three primary methods for Internet advertising: Cost Per Thousand Impressions (CPM); Cost Per Click (CPC); and Cost Per Action (CPA). CPA is not widely used in Web applications, and none of these prior methods alone maximize the potential for advertising revenue generation.

Current leaders in the Web-based email space primarily use the CPM or the CPC model. More specifically, these leaders primarily use banner advertisements with a CPM model to monetize page views. These email systems generate revenue every time a page is viewed with an advertisement embedded in it. Unfortunately, these implementations generate relatively low average revenue per user (ARPU).

Others in the industry use the CPA model in association with banner advertisements. However, these banner advertisements often are perceived as clutter and are not effectively targeted to the current user. As a result, this implementation also generates relatively low ARPU.

Attempts to improve upon this method have been made by introducing the use of a contextual engine to scan the text of an incoming email and display relevant advertisements next to the message to the recipient. However, this method concerns many consumers who believe their privacy is being invaded and thus this method has not been commercially successful. Additionally, as explained in greater detail below, this method is not effective in targeting the appropriate type of advertising to the recipient.

Revenue generation with search advertising works by delivering relevant text advertisements next to the organic search results and charging primarily on a CPC model. Since a user who is performing the search has a given intent, you have the two critical functions you need for success in CPC advertising: relevance and intent.

In email, however, the intent lies with the sender of the email, not the recipient. The recipient's intention is merely to read the message. As a result, even if you deliver relevancy to the content of the message, you are only relevant with context to the sender's intent, not that of the recipient. Thus, the targeted advertising sent to the recipient often is not relevant to their needs or desires. This results in lower click-through rates because users may simply tune these advertisements out over time because they may not be relevant to their needs. The net effect is lower average revenue per user (ARPU) than in paid search.

SUMMARY

A method for generating revenue within an application in accordance with embodiments of the present invention includes determining when at least one of stored data associated with a user of an application, input data entered by the user of the application, and an action by the user of the application corresponds with at least one transactional feature embedded in the at least one application. A first source is associated with the application and a second source is associated with the transactional feature. The transactional feature is provided without leaving the application to the user when the determining determines at least one of the stored data, the input data, and the action corresponds with the transactional feature. At least one selection of one or more transaction options from the corresponding transactional feature is received and at least a portion of the revenue for the received selection is provided to the first source.

A computer readable medium having stored thereon programmed instructions for generating revenue within an application comprising in accordance with other embodiments of the present invention includes determining when at least one of stored data associated with a user of an application, input data entered by the user of the application, and an action by the user of the application corresponds with at least one transactional feature embedded in the at least one application. A first source is associated with the application and a second source is associated with the transactional feature. The transactional feature is provided without leaving the application to the user when the determining determines at least one of the stored data, the input data, and the action corresponds with the transactional feature. At least one selection of one of one or more transaction options from the corresponding transactional feature is received and at least a portion of the revenue for the received selection is provided to the first source.

A system that generates revenue within an application in accordance with other embodiments of the present invention includes a determination system, a display system, a selection processing system, and a revenue processing system. The determination system determines when at least one of stored data associated with a user of an application, input data entered by the user of the application, and an action by the user of the application corresponds with at least one transactional feature embedded in the at least one application. A first source is associated with the application and a second source is associated with the transactional feature. The display system provides the transactional feature without leaving the application to the user when the determination system determines at least one of the stored data, the input data, and the action corresponds with the transactional feature. The selection processing system receives at least one selection of one of one or more transaction options in the provided transactional feature. The revenue processing system provides at least a portion of the revenue for the received selection is provided to the first source.

The present invention provides a number of advantages including providing an effective and automated method for users of a Web-based or client-server software application to complete relevant transactions without leaving the application. The present invention provides the user with the highest quality experience by only providing transactional features the user finds valuable and by eliminating advertisements that are intrusive and clutter the interface. Additionally, this high quality user experience can be accomplished with the present invention without invading the privacy of the user.

The present invention also is able to dramatically simplify the targeted advertising process by leveraging data stored inside the application for the user. The present invention utilizes this data to assist in delivering targeted and relevant transactional features. Additionally, the present invention utilizes this data to simplify the completion of the transactions without leaving the application, such as by pre-populating a delivery address and retrieving credit card information.

Further, the present invention is able to generate far more revenue for both the application provider and service provider than prior comparable methods because the present invention provides transactional features which are more relevant to the user and have a greater likelihood of reflecting the user's intent, and thus have a much higher likelihood of being utilized. The present invention also takes advantage of the CPA model, which has much higher gross revenue. Additionally, the present invention is able to offer these transactional features within the application and this simplified process is more likely to capture these transactions before they are lost by the user browsing the Internet or using an Internet search engine to find a similar service.

BRIEF DESCRIPTION OF THE DRAWINGS

FIGS. 3A-3D are screenshots of an example of the method for generating revenue within an application by ordering flowers;

DETAILED DESCRIPTION

Figure 1:
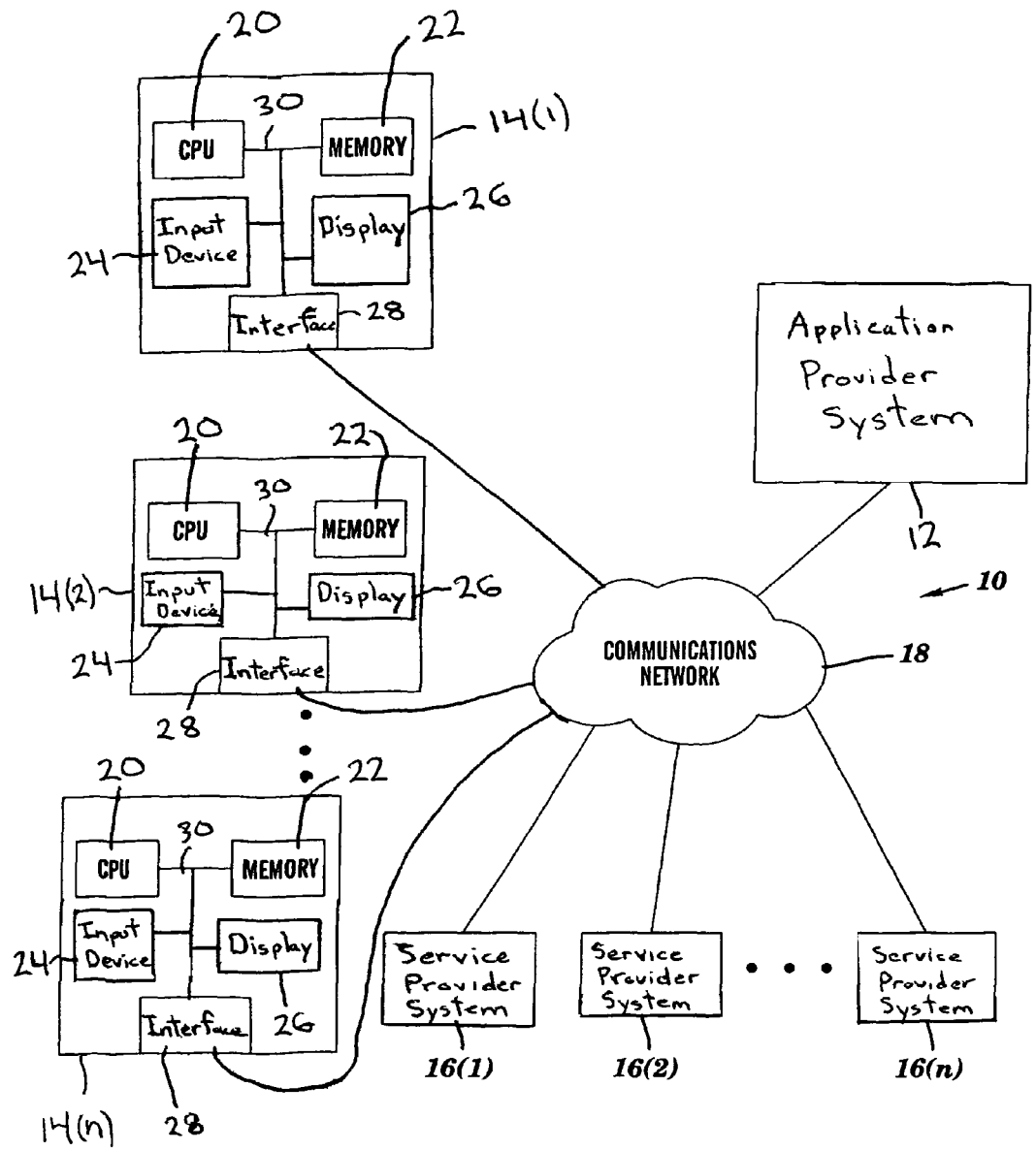
FIG. 1 is a block diagram of a system that generates revenue within an application in accordance with embodiments of the present invention.

A system 10 that generates revenue within an application in accordance with other embodiments of the present invention is illustrated in FIG. 1. The system 10 includes an application provider system 12, user computing systems 14(1)-14(n), service provider systems 16(1)-16(n), and a communications system 18, although the system 10 can comprise other numbers and types of server systems, systems, devices, equipment, and/or components in other configurations. The present invention provides a number of advantages including providing an effective and automatic method for users of a Web-based or client-server software application to complete relevant transactions without leaving the application.

Referring more specifically to FIG. 1, the application provider system 12 provides one or more applications to the user computing systems 14(1)-14(n), such as an email application or a Web page by way of example only, although other numbers and types of systems which provide other numbers and types of applications can be used. The application provider system 12 includes a central processing unit (CPU) or processor, a memory, and an interface system which are coupled together by a bus or other link, although other numbers and types of each of the components and other configurations and locations for the components can be used.

The processor in the application provider system 12 executes a program of stored instructions for one or more aspects of the present invention as described herein, including for generating revenue within an application. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the management server system. The interface system in the application provider system 12 is used to operatively couple and communicate between the application provider system 12 and the user computing systems 14(1)-14(n) and service provider systems 16(1)-16(n) via communications system 18, although other types and numbers of connections and other configurations and other types of communication systems could be used. In this particular embodiment, the communication system 18 is via TCP/IP over Ethernet and uses industry-standard protocols including SOAP, XML, LDAP, and SNMP, although other types and numbers of communication systems, such as a direct connection, a local area network, a wide area network, modems and phone lines, e-mails, and/or wireless communication technology each having their own communications protocols, could be used.

Each of the user computing systems 14(1)-14(n) enable a user to utilize the application from the application provider system 12, such as the email application by way of example only, although one or more of the user computing systems 14(1)-14(n) could utilize other applications and could provide a wide variety of other functions for the user. Each of the user computing systems 14(1)-14(n) includes a central processing unit (CPU) or processor 20, a memory 22, user input device 24, a display 26, and an interface system 28 which are coupled together by a bus or other link 30, although one or more of the user computing systems 14(1)-14(n) can comprise other numbers and types of components and systems in other configurations. The processor 20 executes a program of stored instructions for one or more aspects of the present invention as described and illustrated herein, including the method for generating revenue with an application, although the processor 20 could execute other types of programmed instructions.

The memory 22 stores these programmed instructions for one or more aspects of the present invention as described herein, including the method for generating revenue with an application, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory 22.

The user input device 24 is used to input selections, such as user data including credit card information, appointments, relevant personal dates, i.e. birthdays, anniversary, etc., and other personal data and to interact with applications and transactional features, although the user input device 24 could be used to input other types of data and interact with other elements. The user input device 24 comprises a computer keyboard and a computer mouse, although other types and numbers of user input devices 24 can be used.

The display 26 is used to show data and information to the user, such as the application being utilized and one or more transactional features, although other types of data and information could be displayed and other manners of providing notification can be used, such as via email, page, SMS, and Web. The display 26 comprises a computer display screen, such as a CRT or LCD screen by way of example only, although other types and numbers of displays could be used.

The interface system 28 is used to operatively couple and communicate between the user computing systems 14(1)-14(n) and application provider system 12 and service provider systems 16(1)-16(n) via communications system 18, although other types and numbers of connections and other configurations and other types of communication systems could be used.

Each of the service provider systems 16(1)-16(n) provides one or more transaction options, such as a good or service which may be provided for free or for a fee, although one or more of the service provider systems 16(1)-16(n) could provide other goods or services and could have other functions and other types and numbers of systems could be used. Each of the service provider systems 16(1)-16(n) includes a central processing unit (CPU) or processor, a memory, and an interface system which are coupled together by a bus or other link, although other numbers and types of each of the components and other configurations and locations for the components can be used.

The processor in each of the service provider systems 16(1)-16(n) executes a program of stored instructions for one or more aspects of the present invention as described herein, including for generating revenue within an application. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in the management server system. The interface system in each of the service provider systems 16(1)-16(n) is used to operatively couple and communicate between the service provider systems 16(1)-16(n) and the application provider system 12 and user computing systems 14(1)-14(n) via communications system 18, although other types and numbers of connections and other configurations and other types of communication systems could be used.

Although an example of embodiments of the application provider system 12, the user computing systems 14(1)-14(n), and the service provider systems 16(1)-16(n) are described and illustrated herein, each of the application provider system 12, the user computing systems 14(1)-14(n), and the service provider systems 16(1)-16(n) of the present invention could be implemented on any suitable computer system or computing device. It is to be understood that the devices and systems of the exemplary embodiments are for exemplary purposes, as many variations of the specific hardware and software used to implement the exemplary embodiments are possible, as will be appreciated by those skilled in the relevant art(s).

Furthermore, each of the systems of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing systems or devices can be substituted for any one of the systems in any embodiment of the present invention. Accordingly, principles and advantages of distributed processing, such as redundancy, replication, and the like, also can be implemented, as desired, to increase the robustness and performance of the devices and systems of the exemplary embodiments. The present invention may also be implemented on computer system or systems that extend across any network using any suitable interface mechanisms and communications technologies including, for example telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like.

The present invention may also be embodied as a computer readable medium having instructions stored thereon for generating revenue within an application as described herein, which when executed by a processor, cause the processor to carry out the steps necessary to implement the methods of the present invention as described and illustrated herein.

Figure 2A:
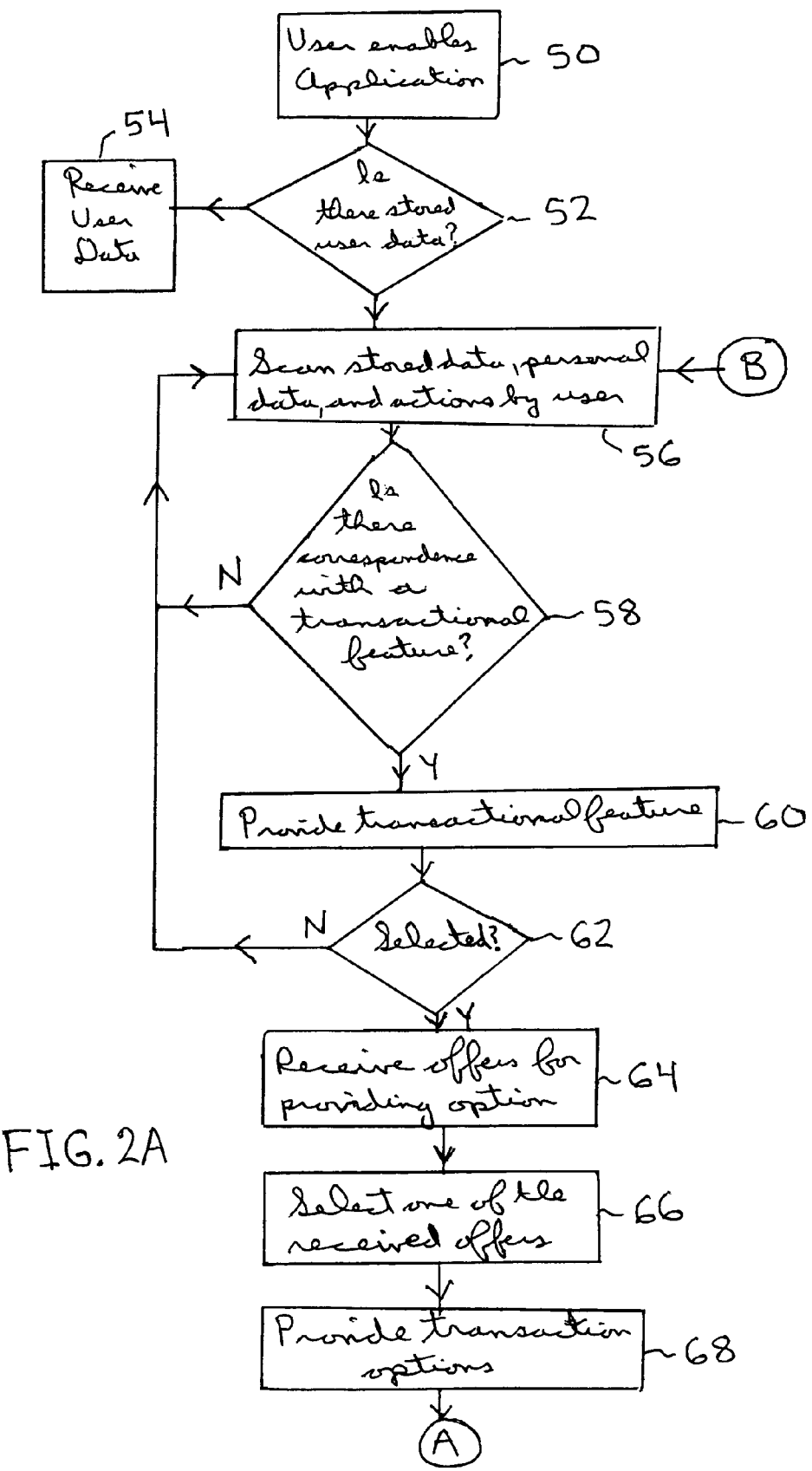
FIGS. 2A-2C is a flow chart of a method for generating revenue within an application in accordance with embodiments of the present invention.
Figure 2B:
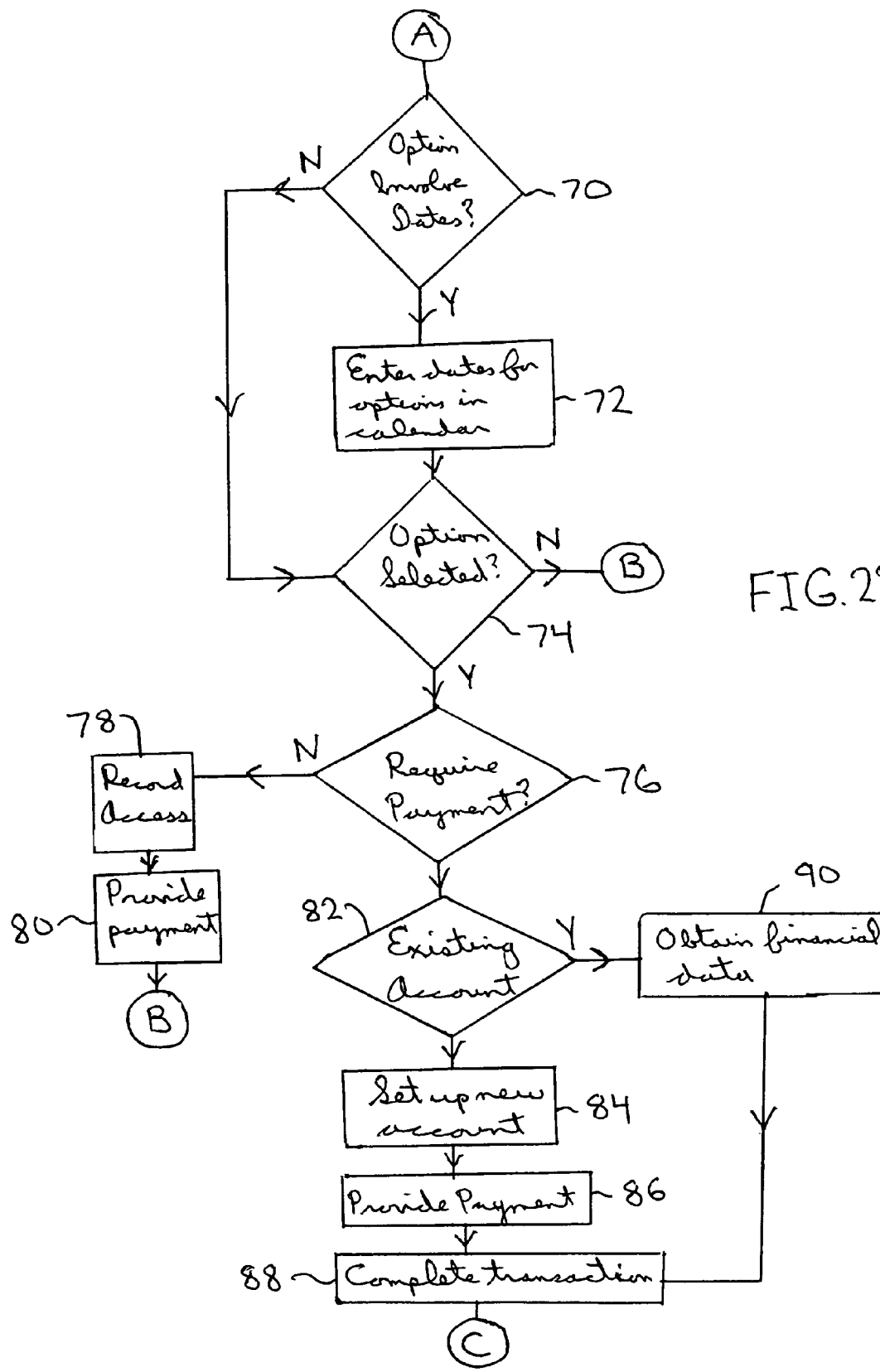
Figure 2C:
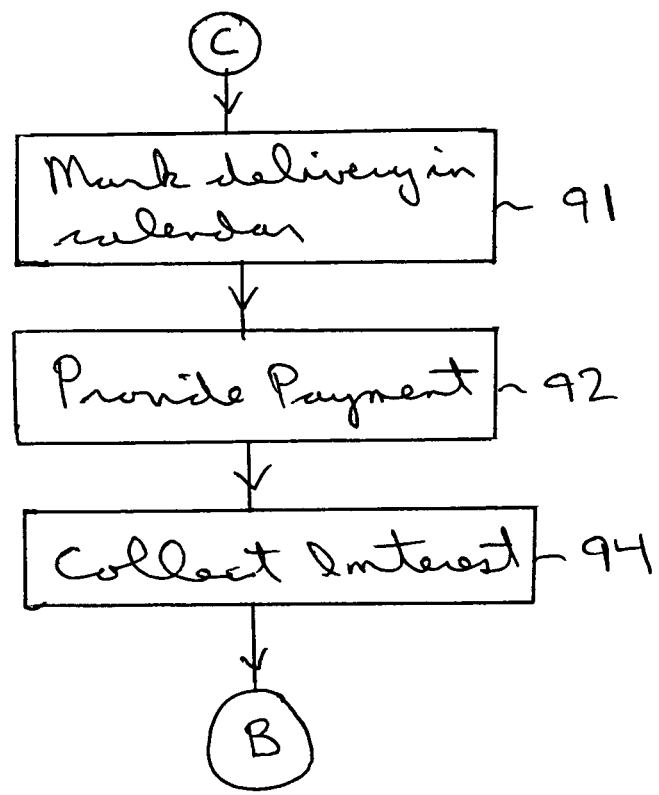

The operation of the system in accordance with embodiments of the present invention will now be described with reference to FIGS. 2A-2C. In step 50, a user at one of the user computing systems 14(1)-14(n) utilizes an application from the application provider system 12, such as an email application.

In step 52, the application provider system 12 or the one of the user computing systems 14(1)-14(n) being utilized, determines if there is any data stored for the user, such as credit card information, appointments, relevant personal dates, i.e. birthdays, anniversary, etc., and other personal data, that could be used to enable one or more transactional features offered by one or more of the service provider system 16(1)-16(n). If relevant data for the user is not identified or is incomplete, then the No branch is taken to step 54 where the user is prompted to enter the data, although other manners for identifying data associated with the user can be used. The particular prompts used in step 54 to request the data are based on the particular types of available transactional features available from the service provider systems 16(1)-16(n). If relevant data for the user is identified and complete, then the Yes branch is taken to step 56.

Figure 4A:
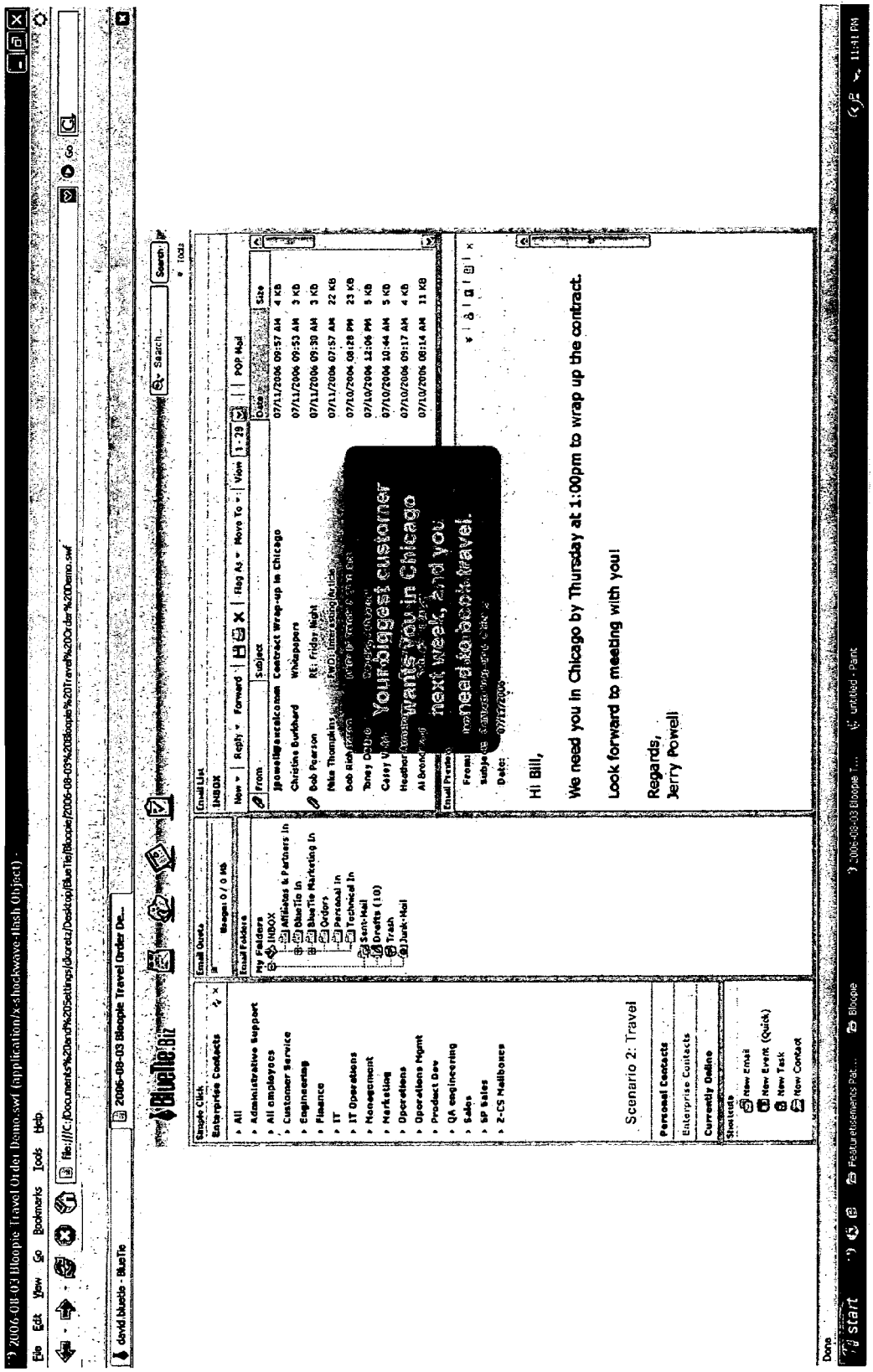
FIGS. 4A-4G are screenshots of an example of the method for generating revenue within an application by booking travel.
Figure 5A:
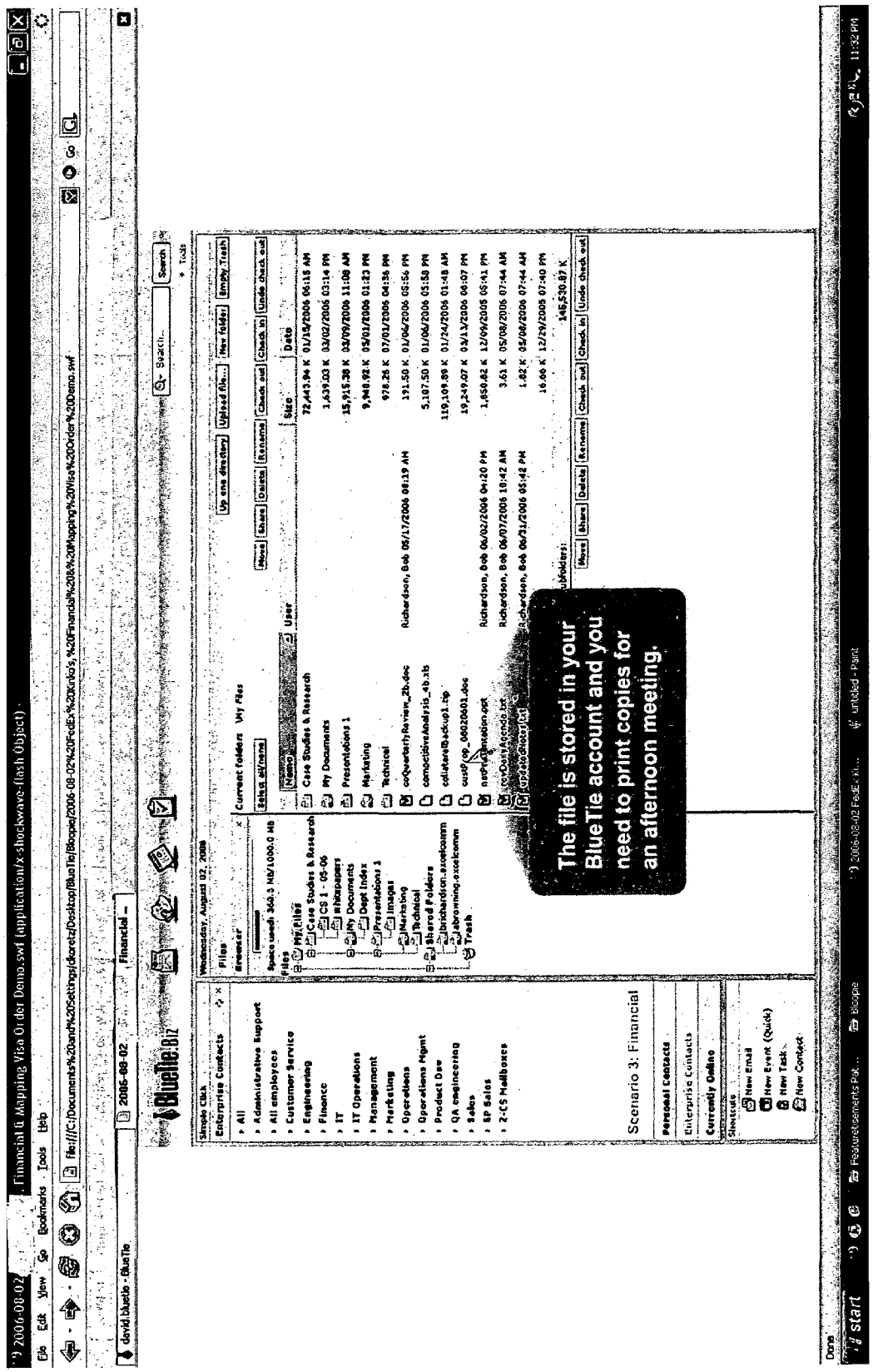
FIG. 5A-5F are screenshots of an example of the method for ordering hard copies of a presentation for a proposal.

In step 56, the application provider system 12 or the one of the user computing systems 14(1)-14(n) periodically scans the identified data for or actions by the user for a correspondence with one or more of the transactional features associated with one or more of the service providers 16(1)-16(n), although other manners for scanning the data can be used. For example, the user at one of the user computing systems 14(1)-14(n) may use the user input device 24 to enter a personal data driven page in the application which contains user data. When the user at one of the user computing systems 14(1)-14(n) enters one of these personal data driven pages, then the application provider system 12 or the one of the user computing systems 14(1)-14(n) being used scans the data for the user on the personal data driven page to look for a correspondence with one or more of the transactional features associated with one or more of the service providers 16(1)-16(n), although the data associated with the personal data driven page could be at and retrieved from other locations, such as at another database, file, or other storage device. In another example, the user at one of the user computing systems 14(1)-14(n) may input a real-time data entry, such as booking a flight, scheduling a meeting, renting a car, or booking a hotel, and the application provider system 12 or the one of the user computing systems 14(1)-14(n) being used scans this data entry for a correspondence with one or more of the transactional features associated with one or more of the service providers 16(1)-16(n) which would be an intelligent response to the data entry by the user, although other types of data entry and actions could be used. In yet another example, the user at one of the user computing systems 14(1)-14(n) may take an action regarding existing data and the application provider system 12 or the one of the user computing systems 14(1)-14(n) being used scans this action for a correspondence with one or more of the transactional features associated with one or more of the service providers 16(1)-16(n) which would be an intelligent response to the action taken by the user. By way of example, the user at one of the user computing systems 14(1)-14(n) may select a particular email message, and the application provider system 12 or the one of the user computing systems 14(1)-14(n) being used scans this email for a correspondence with one or more of the transactional features, such as correspondence between an email message about a proposal with the proposal attached in a file and a transaction feature for printing services as shown in FIG. 5A or correspondence between an email message about a meeting in Chicago and a transactional feature for travel services as shown in FIG. 4A.

In step 58, a determination is made by the application provider system 12 or the one of the user computing systems 14(1)-14(n) if there is correspondence or a match between the retrieved data for the user, the data on the personal data driven page which has been entered by the user, or an action by the user at one of the user computing systems 14(1)-14(n) to enable one or more of the transactional features associated with one or more of the service providers 16(1)-16(n), although the application provider system 12 or the one of the user computing systems 14(1)-14(n) could enable a transactional feature based on other types of matches or in other manners. If correspondence is not found, then the No branch is taken in step 58 and returns to step 56 as described earlier. If a correspondence is found, then the Yes branch is taken in step 58 to step 60.

Figure 3A:
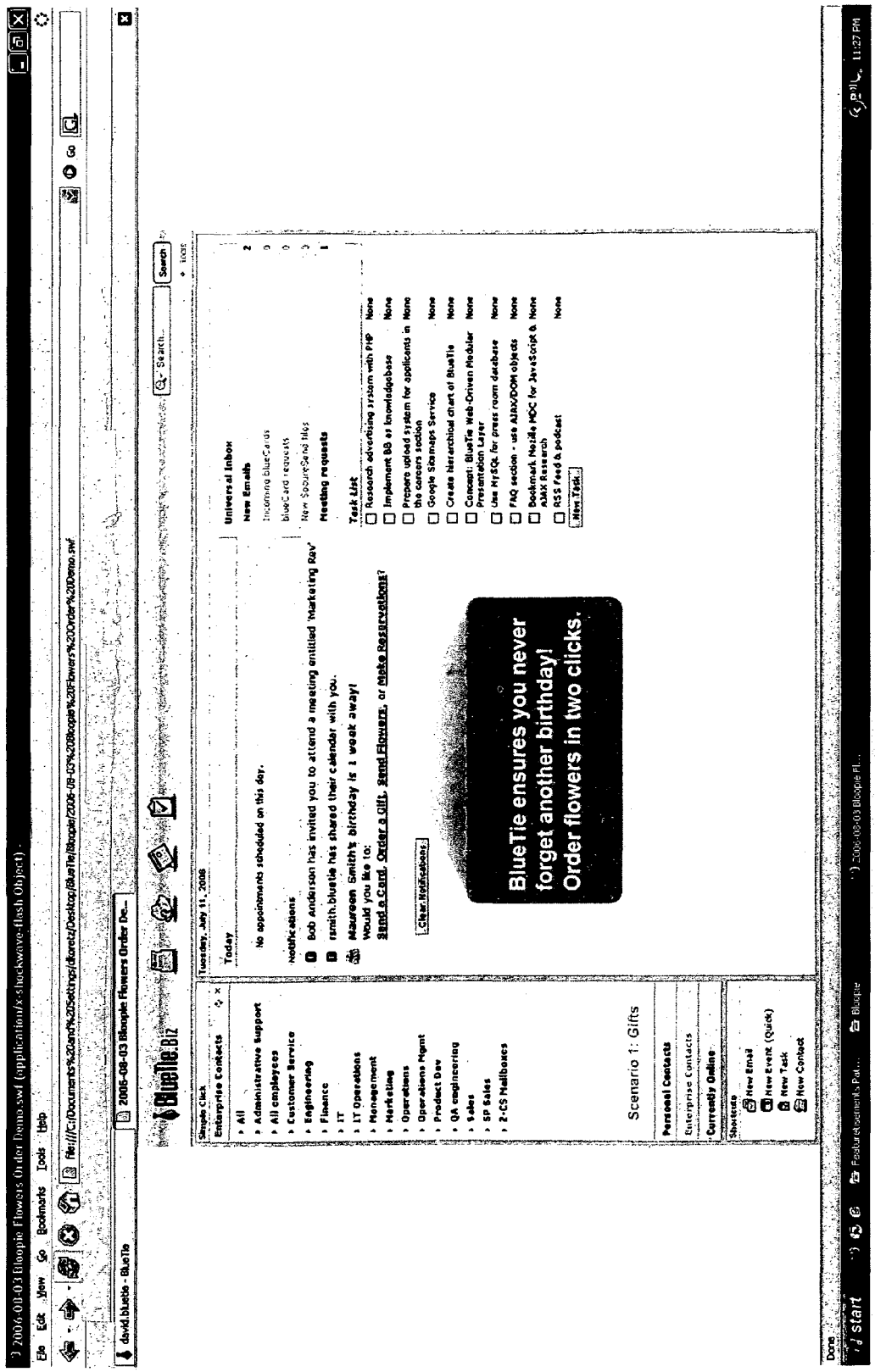
Figure 4B:
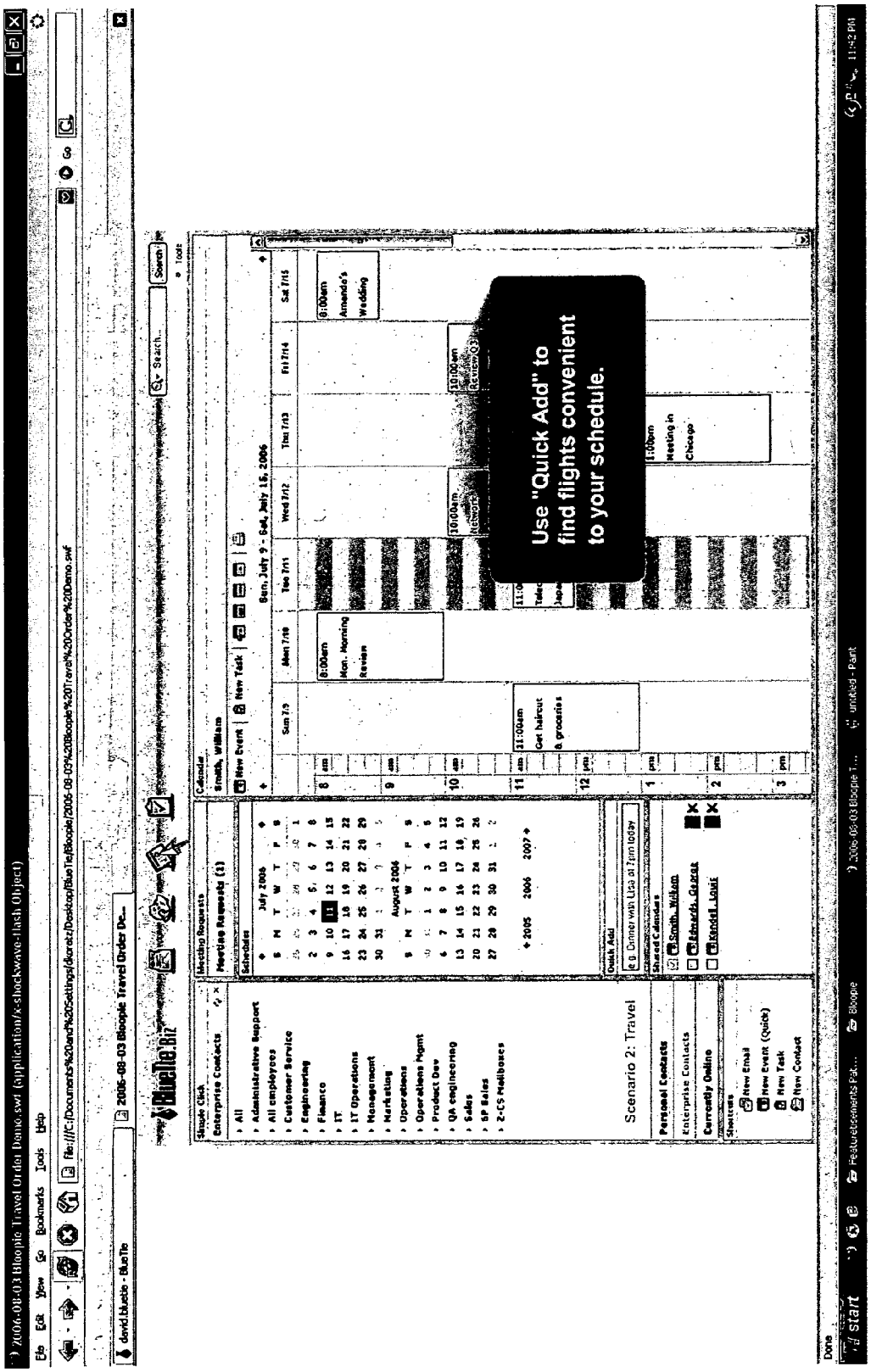
Figure 5B:
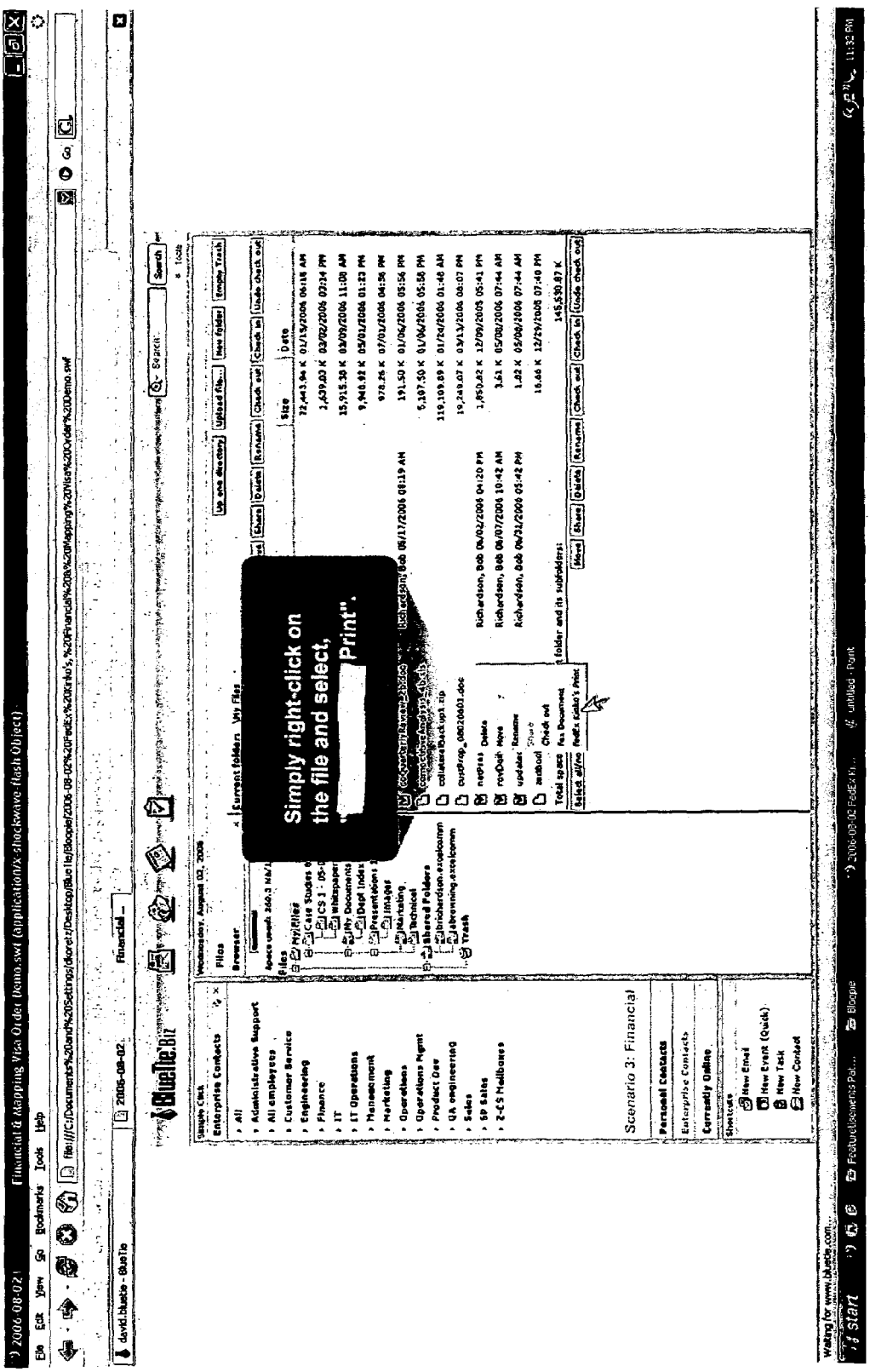

In step 60, the corresponding transactional feature or features which has/have been enabled is/are displayed within the application, although other manners for showing the transactional features could be used, such as having the user input a request to see the available transactional feature or features. By way of example only, the transactional features on display could be a set of links to send a card, order a gift, send flowers, or make reservations, displayed within the email application as shown in FIG. 3A, although other manners for displaying the transactional feature or features with the application can be used. In another example, the transactional feature could be travel services to schedule a flight as shown in FIG. 4B or the transactional feature could be copy services as shown in FIG. 5B.

In step 62, the one of the user computing systems 14(1)-14(n) determines if one of the links for the displayed transactional features within the application have been selected by the user using the user input device 24, although other manners for making the selection can be used. If none of the links are selected by the user, then the No branch can be taken back to step 56 as described earlier. If one of the links for one of the transactional features is selected, then the Yes branch is taken to step 64.

In step 64, the application provider system 12 optionally may request solicitations for and receive offers from one or more of the service provider system 16(1)-16(n) to provide a transactional option or options for the selected transactional feature. In step 66, the application provider system 12 will select one of these received offers from one or more of the service provider systems 16(1)-16(n) based on one or more criteria. A variety of different types of criteria can be used for this determination, such as the amount or percentage of compensation that will be provided to the application provider system 12 from the selected one of the service provider systems 16(1)-16(n) for any completed transactions. Although in this particular embodiment, the offers are received after the particular transactional feature is selected, other methods for arranging the service providers can be used, such as receiving offers for and selecting one or more service providers for each of the transactional features before any correspondence between the data or actions of the user and a transactional feature or features is identified.

Figure 3B:
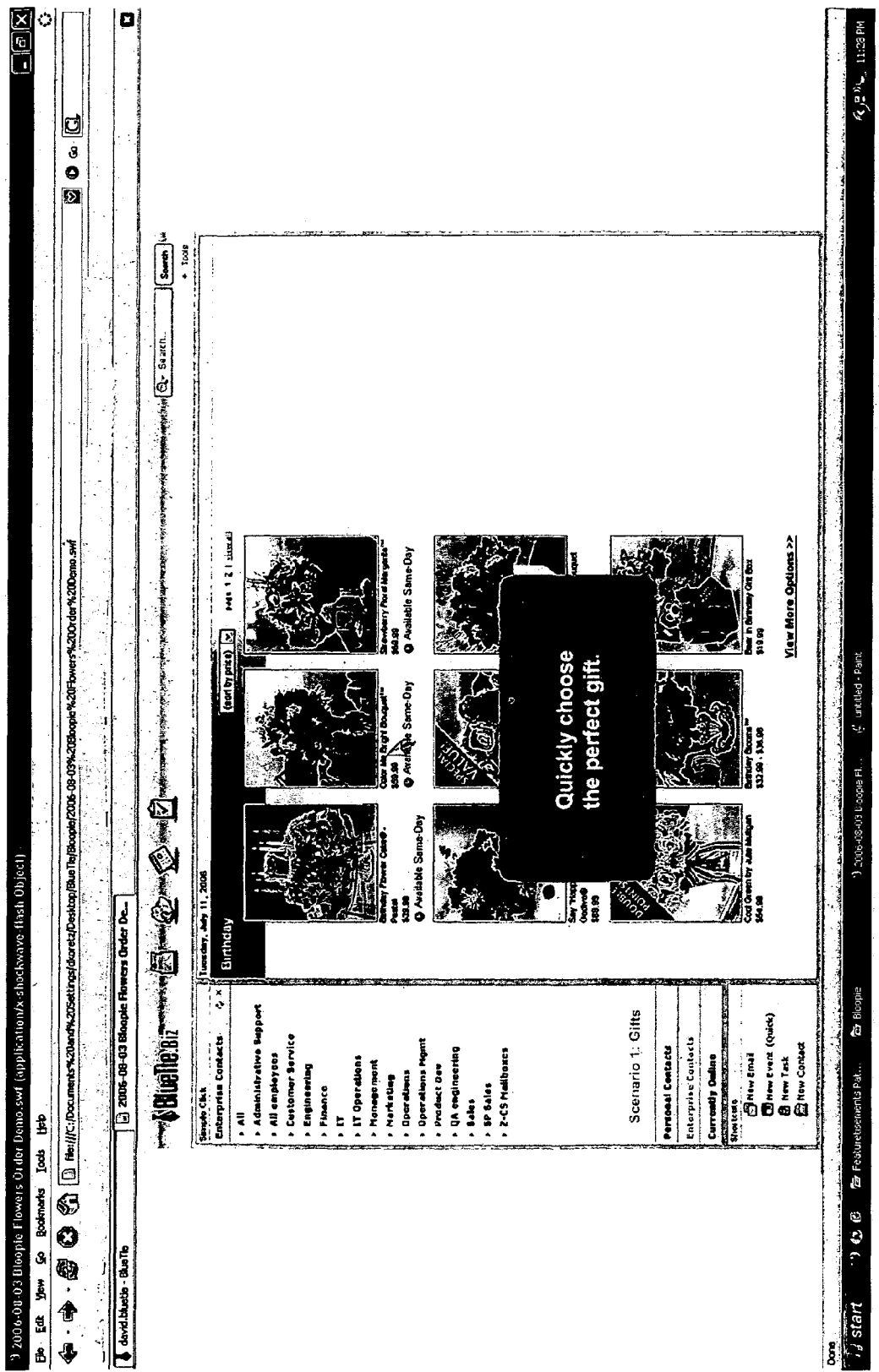
Figure 4C:
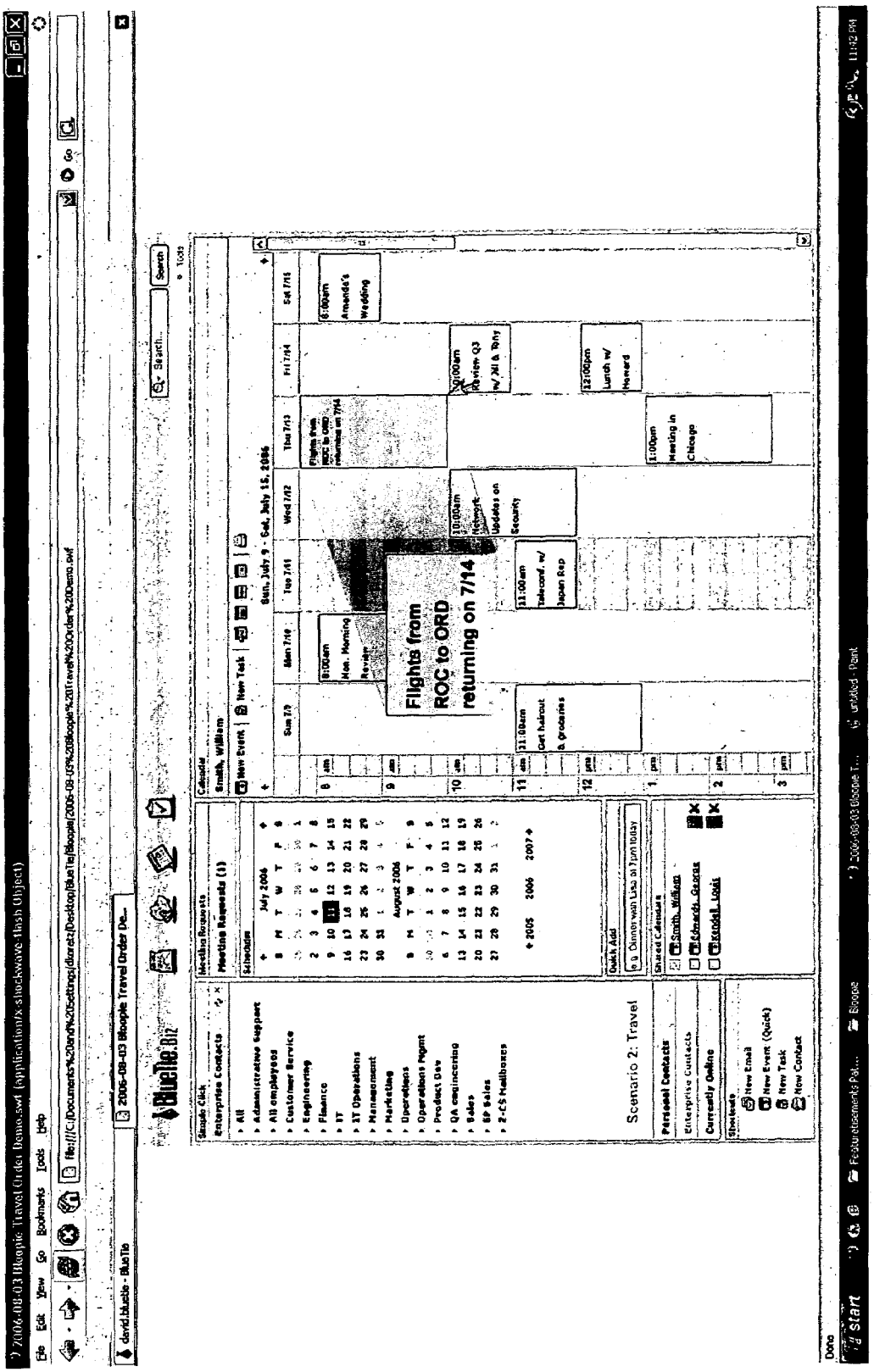
Figure 4D:
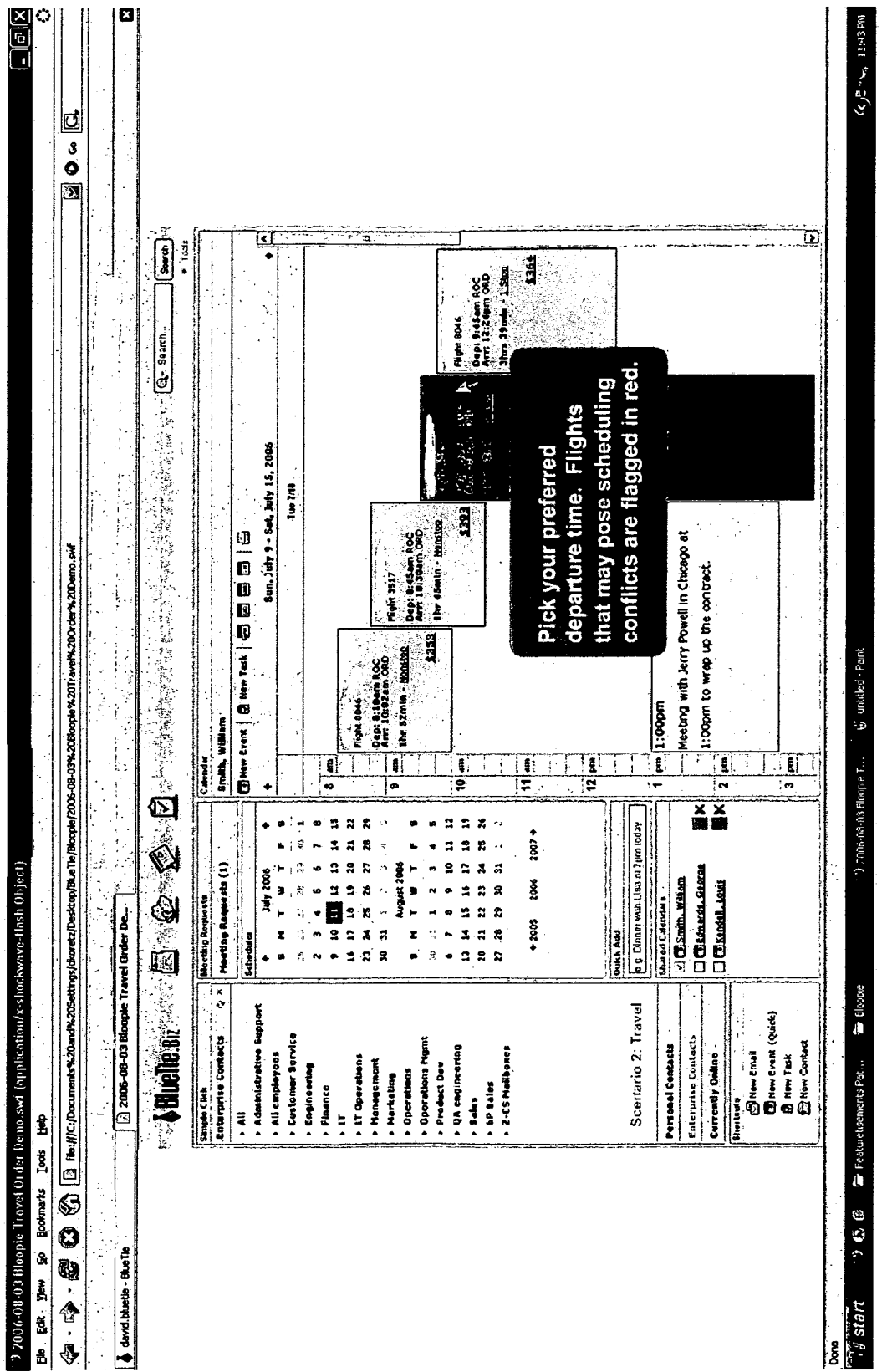
Figure 5C:
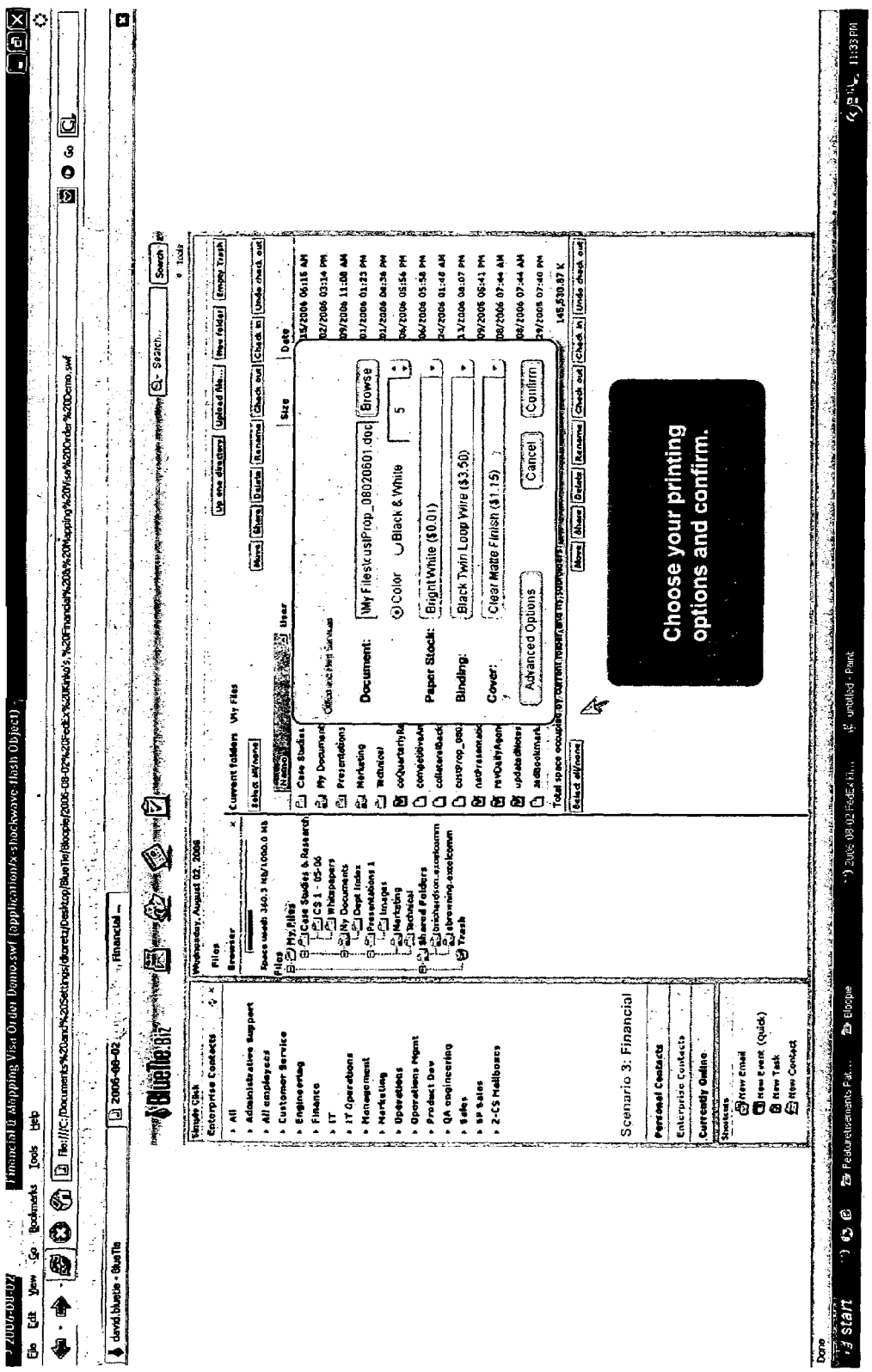

In step 68, the transaction options associated with the selected transactional feature from the selected one of the service provider systems 16(1)-16(n) are displayed on the display system 26, although other manners for providing the transaction options to the user could be used. By way of example only, if the user at one of the user computing systems 14(1)-14(n) selected the link for the transactional feature to send flowers shown in FIG. 3A, then the user would be provided in the display 26 with a number of flower options to select from while still in the email application as shown in FIG. 3B. In another example, if the user at one of the user computing systems 14(1)-14(n) selected the link for the transactional feature for travel services to book a flight as shown in FIGS. 4B-4C, then the user would be provided in the display 26 with a number of options for flights as shown in FIG. 4D. In yet another example, if the user at one of the user computing systems 14(1)-14(n) selected the link for the transactional feature for copies as shown in FIG. 5B, then the user would be provided in the display 26 with a number of options for the copies to select from while still in the email application as shown in FIG. 5C.

Figure 4E:
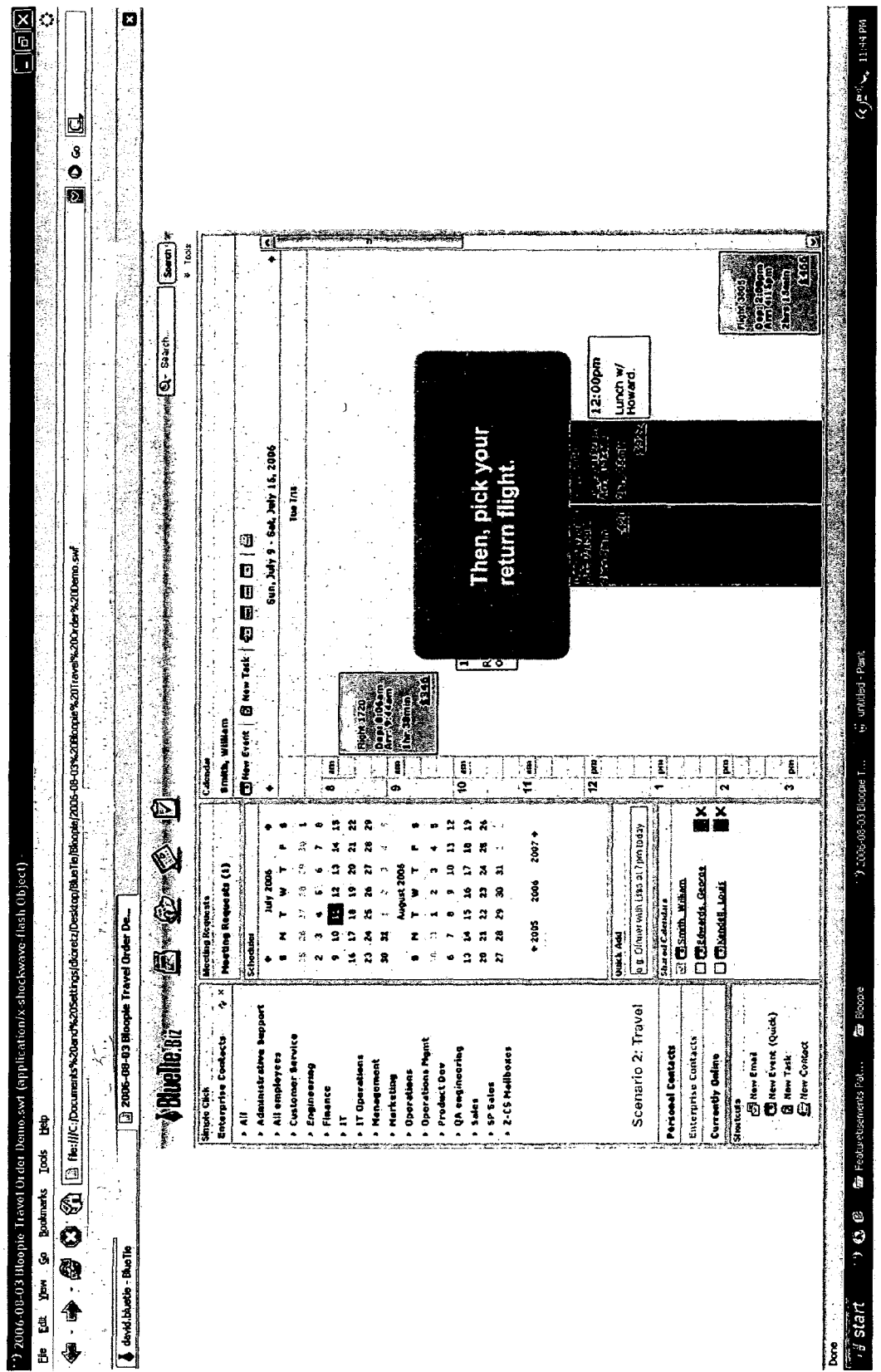

In step 70, the application provider system 12 or the one of the user computing systems 14(1)-14(n) determines if one or more of the transaction options involve times and/or dates, such as different flight options. If one or more of the transaction options involve times and/or dates, then the Yes branch is taken to step 72 where the transaction options are entered into a calendar application for the user at the one of the user computing systems 14(1)-14(n) and then proceeds to step 74. By entering the time and date for each transaction option, the user is able to see how the different transaction options correspond with the schedule of the user so that appropriate plans and/or changes to the schedule can be made. Additionally, the present invention provides an indication with each of the transaction options if that transaction option interferes with a previously scheduled appointment in the calendar of the user, such as with a different color designation or other marker. By way of example only, flight options for departing and returning flights are illustrated in FIGS. 4D and 4E with flights the do not pose an existing conflict in blue and flights that pose a conflict in pink, although other colors or indicators could be used. If one or more of the transaction options does not involve times and/or dates, then the No branch is taken to step 76.

Figure 3C:
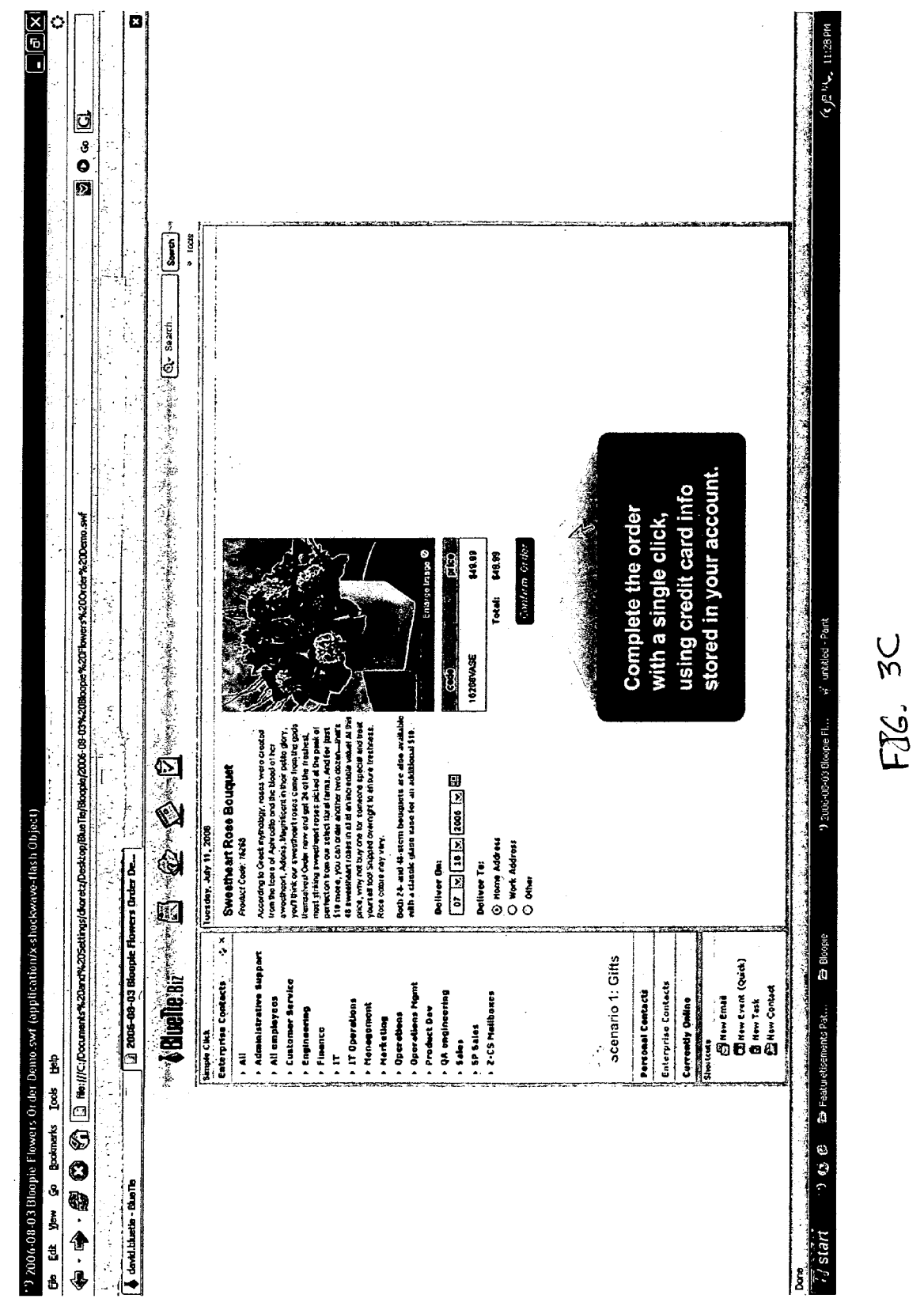
Figure 4F:
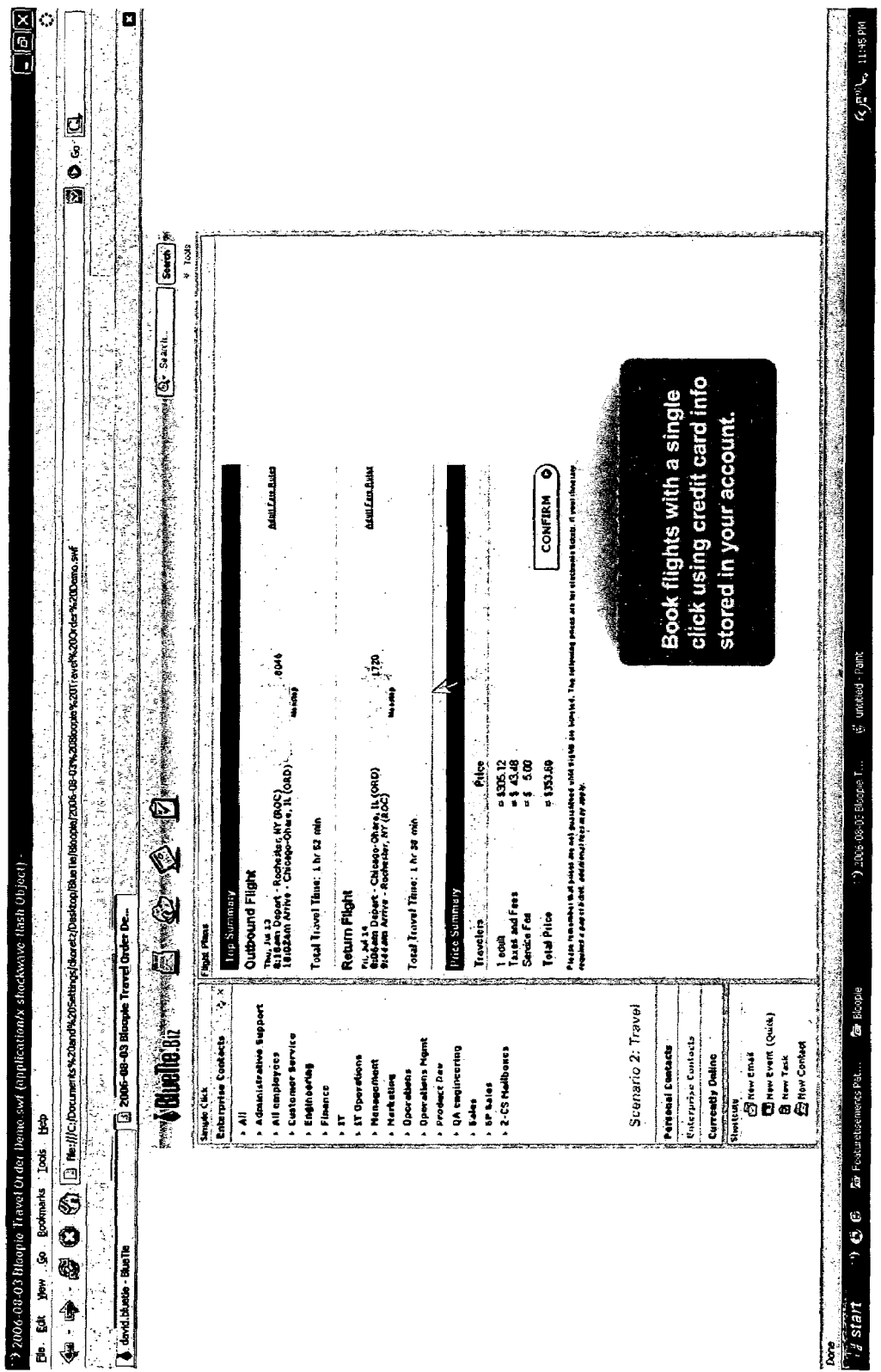

In step 76, the application provider system 12 or the one of the user computing systems 14(1)-14(n) determines if one of the transaction options has been selected. By way of example only, the option for the sweetheart rose bouquet can be selected by activating the confirm order tab with user input device 24 in the display 26 as shown in FIG. 3C. In another example, the departing and returning flights can be selected by using the user input device 24 to click on one of the displayed departing and returning flights shown in FIGS. 4D and 4E and then by activating the confirm tab with user input device 24 in the display 26 as shown in FIG. 4F. If none of the transaction options are selected, then the No branch can be taken back to step 56 as described earlier and no transaction is completed. If one of the transaction options is selected, then the Yes branch is taken to step 76.

In step 76, the application provider system 12 or the one of the user computing systems 14(1)-14(n) determines if the selected transaction option requires a payment. If the selected transaction option does not require a payment, then the No branch is taken to step 78. In step 78, the application provider system 12 or the one of the service provider systems 16(1)-16(n) records the access by the user which can be used to determine a payment to the application provider system 12 for each user which is directed to the one of the service provider systems 16(1)-16(n), such as under a CPC method. In step 80, a payment is provided to the application provider system 12 from the one or more of the service provider systems 16(1)-16(n) based on the number of times users access their websites, although other methods for determining a payment for directing users to a website can be used. Following step 80, the system 10 returns to step 56 as described earlier. If in step 76 the selected transaction option requires a payment, then the Yes branch is taken to step 82.

Figure 5D:
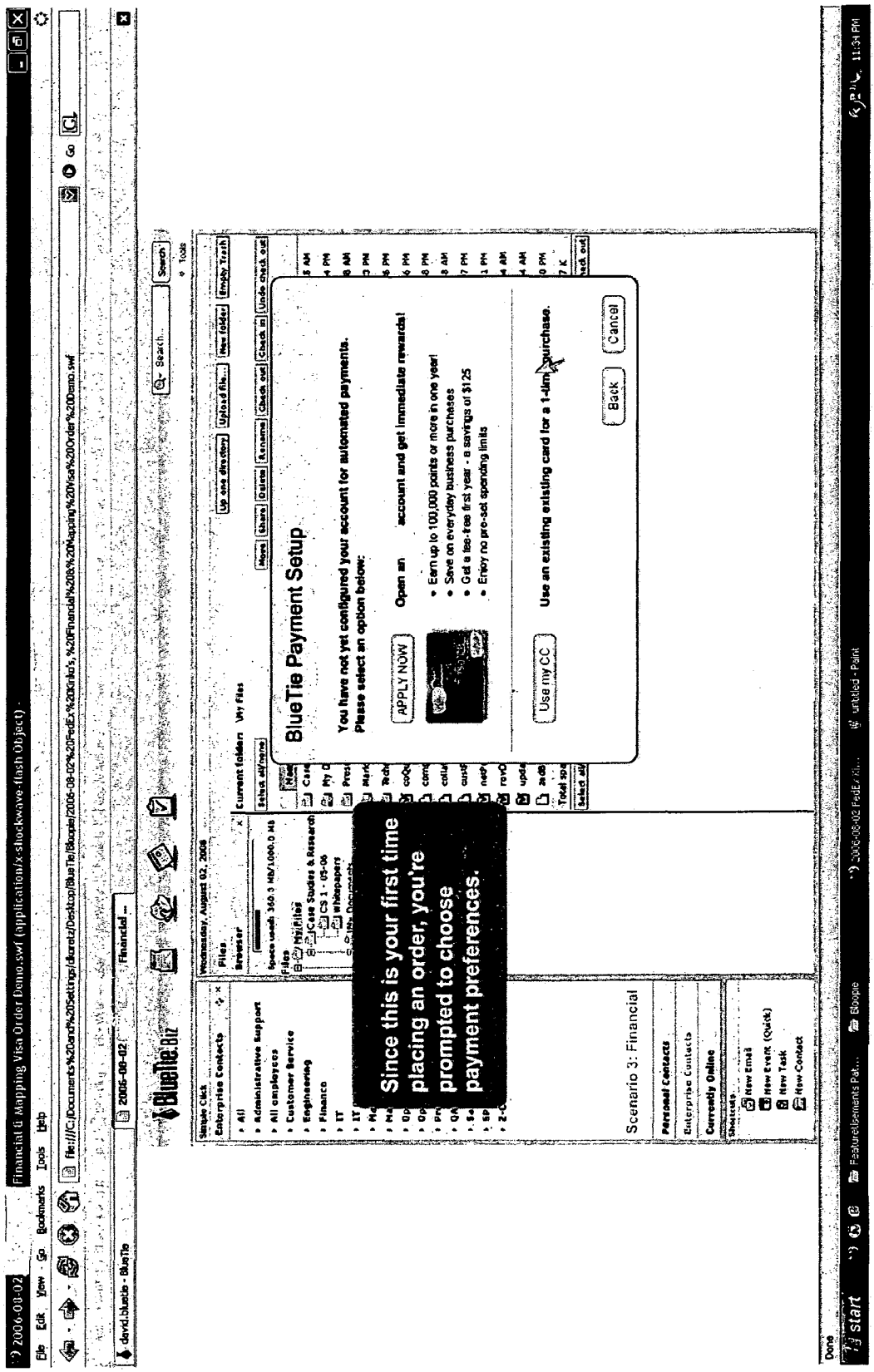

In step 82, the application provider system 12 or the one of the user computing systems 14(1)-14(n) determines if the user that is engaged in the transaction has an existing account with financial data, such as a credit card account by way of example only, to complete the transaction. The user at one of the user computing systems 14(1)-14(n) may be prompted to identify if the user has an existing account or would like a new account as shown in the example in FIG. 5D. If the user would like to set up a new account in step 82, then the No branch is taken to step 84.

Figure 5E:
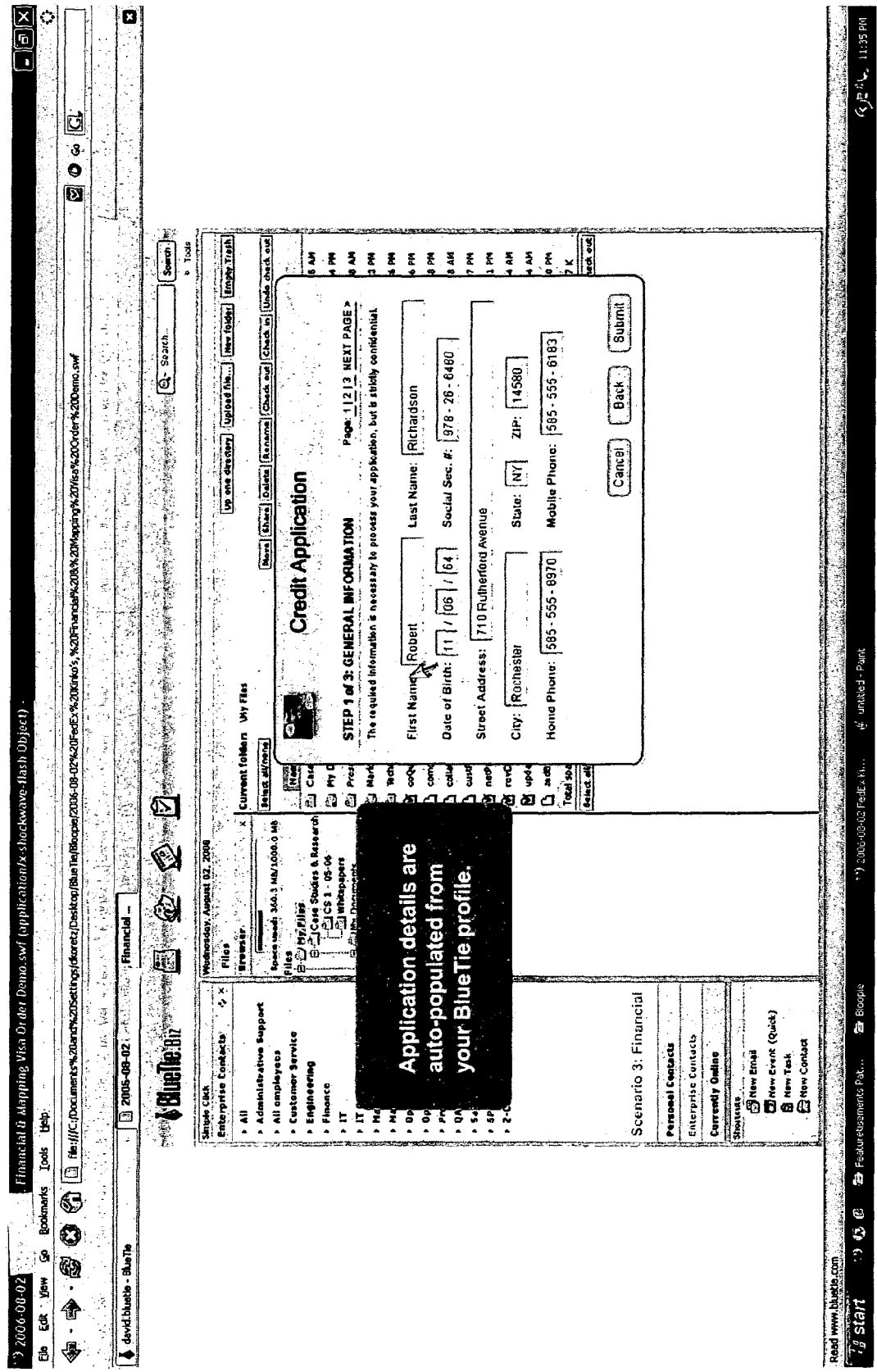
Figure 5F:
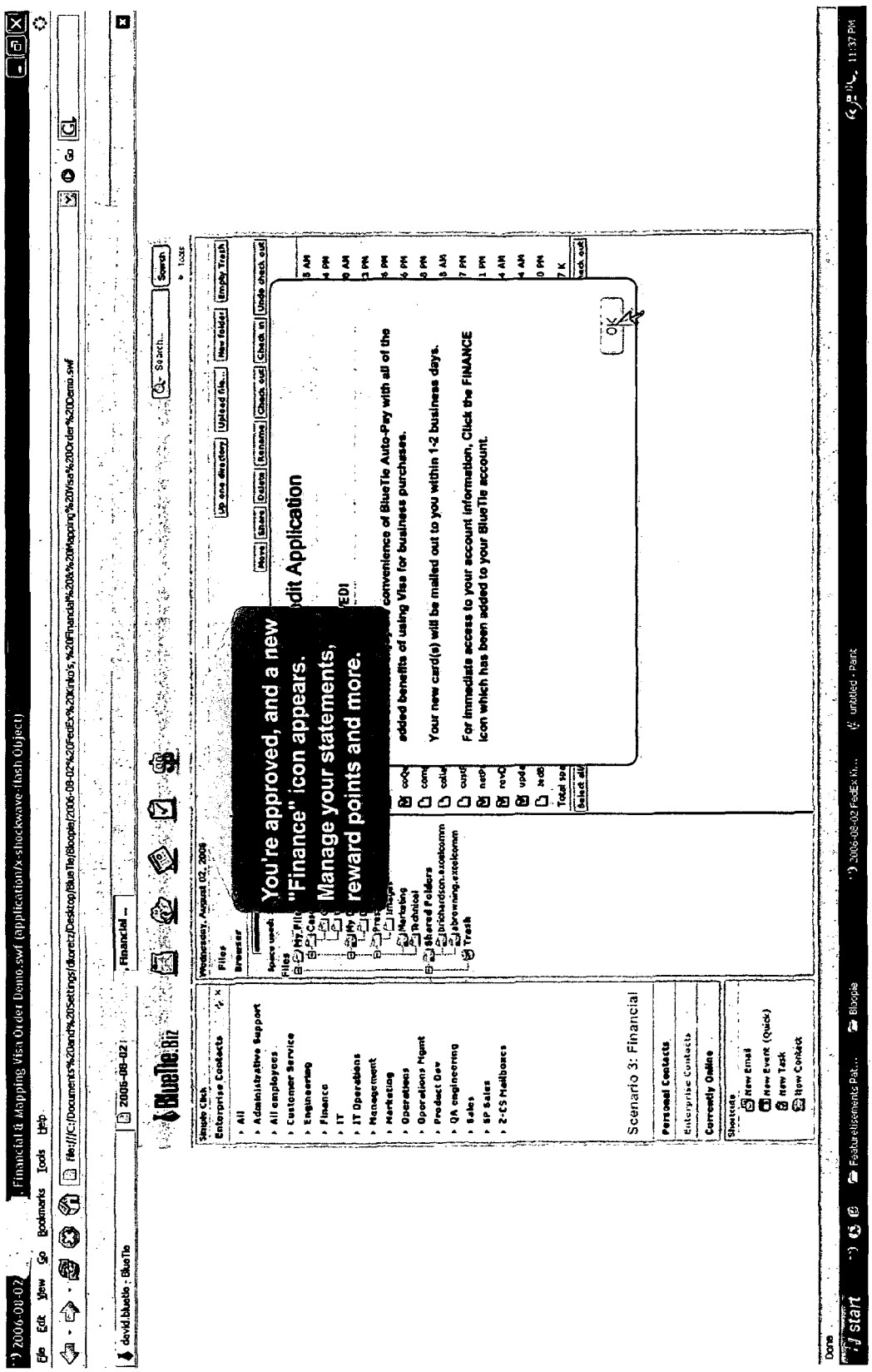

In step 84, the user at one of the user computing system 14(1)-14(n) enters data using user input device 24 into the fields shown on the display system 26, although other manners for entering the data can be used, such as having the data auto-populated from data stored and retrieved from other sources. The data received from the user is processed by one of the service provider system 16(1)-16(n) to determine if the user is approved to set up a new credit account. If the new credit account is approved, the credit account data is stored with the application provider system 12 for easier and simpler access to control the completion of transactions within the application, although the credit account data could be stored in other locations, such as with one or more of the service provider systems 16(1)-16(n). By way of example only, a screenshot of the fields for entering data for a credit application are shown in FIG. 5E and a screenshot of an approved application is illustrated in FIG. 5F. In step 86, the one of the service provider system 16(1)-16(n) that set up the new credit account provides a payment to the application provider system 12 for the new credit account, although other methods for determining the payment could be used. By way of example only, one of the service providers systems 16(1)-16(1) could pay the application provider system 12 for every user created as compensation for having their transactional feature displayed. In this model, the application provider system 12 would be paid on active users each month rather than on a CPA model. This model enables a service provider to pay a fixed amount to advertise its services to a fixed set of active users, thus removing common variables that affect marketing.

If the user would like to set up an existing account with the application service provider 12 in step 82, then the Yes branch is taken to step 90, although the existing account could be held by others, such as one of the service provider systems 16(1)-16(n). In step 90, the application provider system 12 retrieves the financial data for the credit account of the user from memory, or the user enters and saves the financial data for the credit account in memory, although the financial data can be retrieved from other sources and with other systems, such as with one of the service provider system 16(1)-16(n).

Next, in step 88 after the new or existing valid credit account data is obtained, the application provider system 12 completes the transaction for the selected transaction option by the user at one of the user computing systems 14(1)-14(n), although other systems could complete the transaction, such as one of the service provider systems 16(1)-16(n).

Figure 3D:
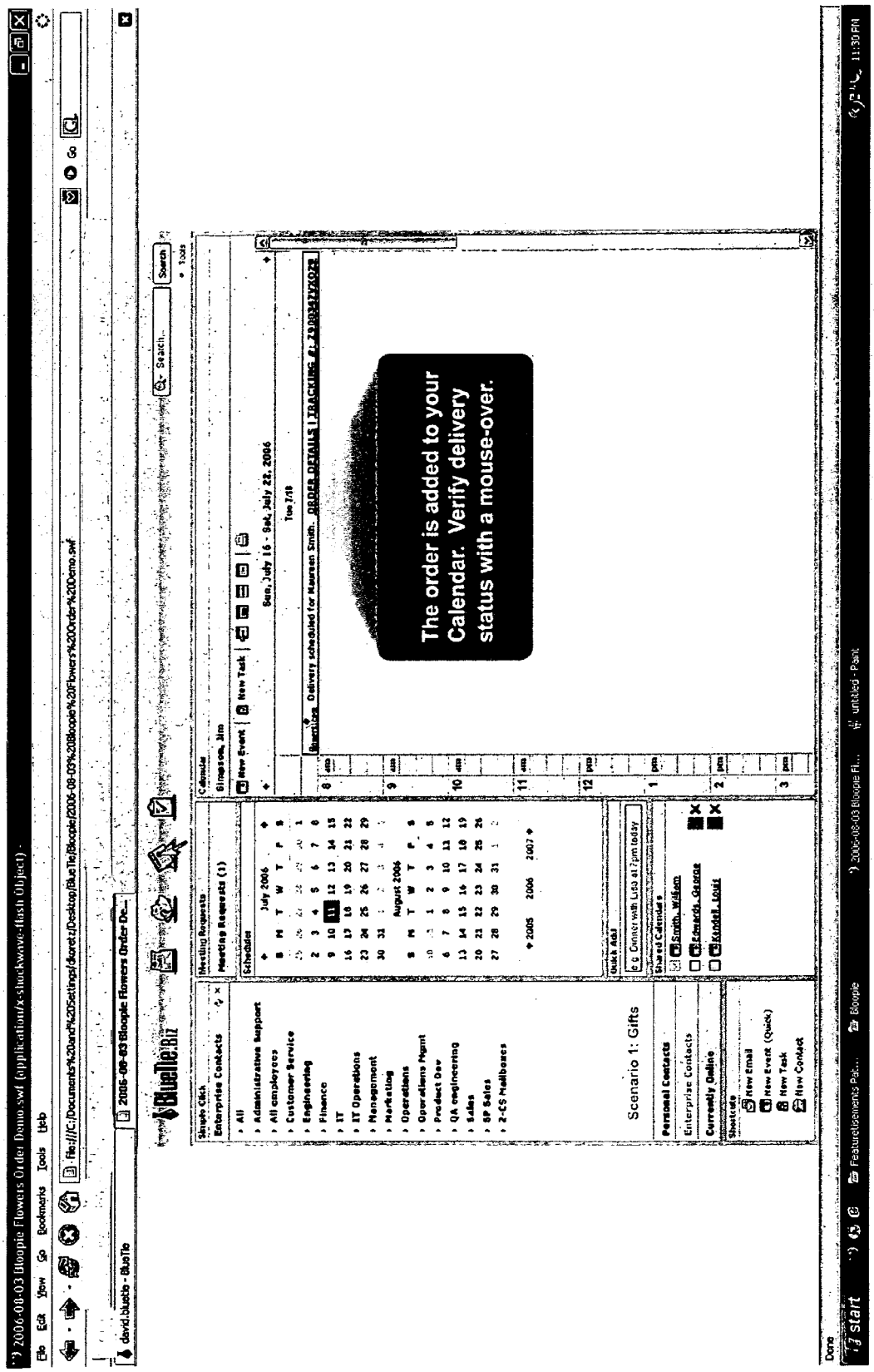
Figure 4G:
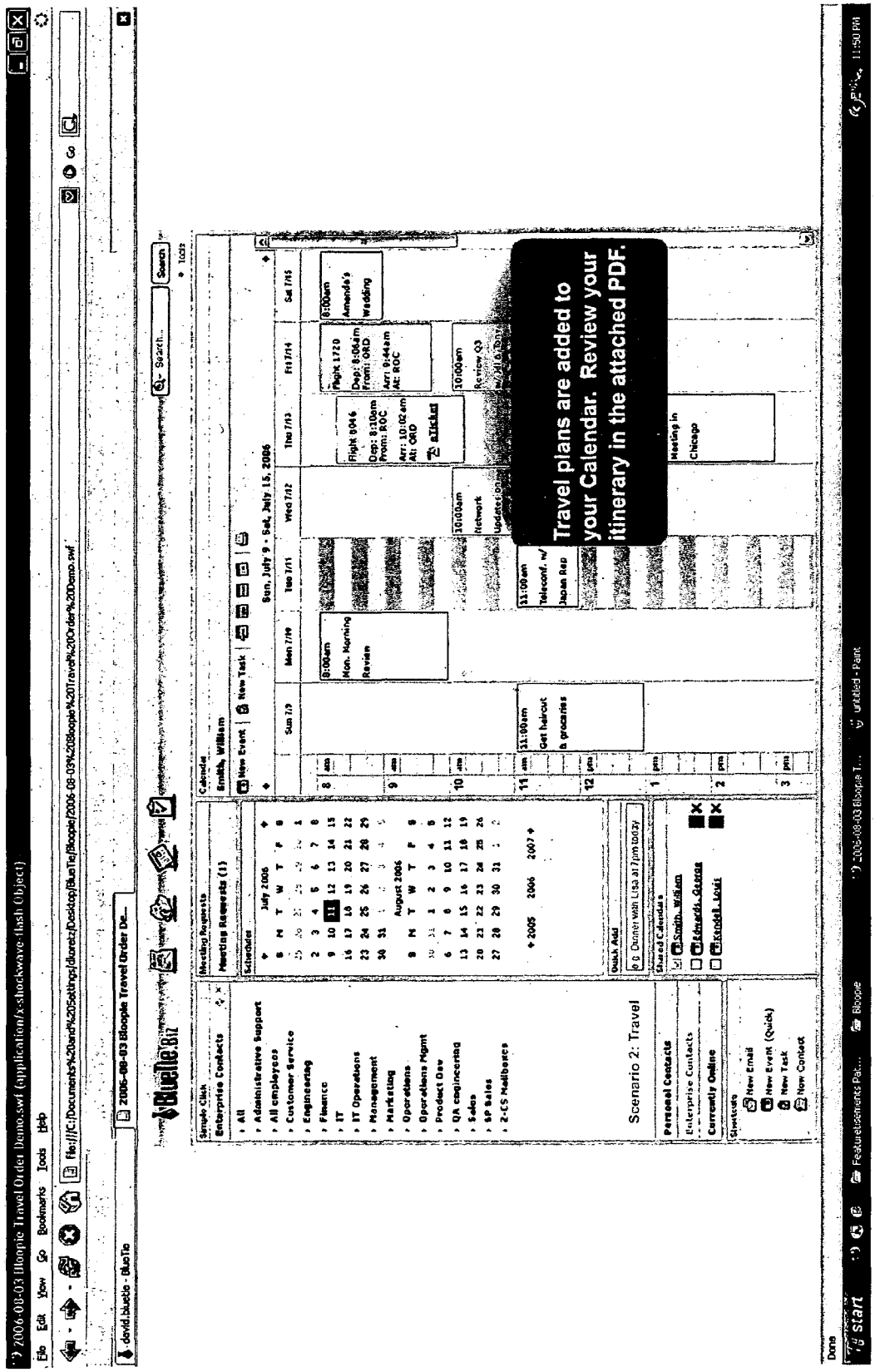

In step 91, if the completed transaction option involves a time and/or date, then the application provider system 12 or the one of the user computing systems 14(1)-14(n) can add the time and/or date of the completed transaction option to the calendar application for the user. By way of example only, the delivery date of ordered flowers may be added to the calendar application of the user as shown in FIG. 3D. In another example, the departing and returning flights of booked travel arrangements may be added to the calendar application of the user as shown in FIG. 4G, although this information may be added to other applications and systems and at other times.

In step 92, the application provider system 12 may pay the one or more service provider systems 16(1)-16(n) on a periodic basis, such as monthly, for the services and/or goods provided to users at one or more of the user computing systems while retaining a portion or percentage of the revenue for each of the completed transactions, although other payment arrangements can be used. For example, the service provider system 16(1)-16(n) could collect the revenue for each completed transaction and pay the application provider system 12 a portion or percentage of the revenue for each of the completed transactions.

In step 94, the application provider system 12 can optionally collect and retain the interest on the revenue or float to be paid to the one or more service provider systems 16(1)-16(n) on the periodic basis. The interest on this float provides the application provider system 12 another manner for generating revenue from the completed transactions within the application.

Accordingly, as described herein the present invention is able to provide an effective and automatic method for users of a Web-based or client-server software application to complete relevant transactions without leaving the application. With the present invention, a user can perform many categories of transactions, including, but not limited to flower ordering, gift ordering, mapping and driving directions, yellow pages, travel ordering, event ticket ordering, weather information, faxing, email marketing, web conferencing, and package delivery. With embodiments of the present invention, service providers, such as advertisers, are only charged for transactions that are completed. As described herein, these transactions can be single purchases of a product or service, sign-up for a recurring service, traffic generation for third-party content sites, or fixed cost per active user. These service providers pay at least one of a percentage of revenue and fixed amount that is generated to the application provider so there is no risk like in traditional advertising models.

The present invention is versatile and can be added to a wide range of applications, including, but not limited to calendars, contacts, task management, instant messaging, Voice over Internet Protocol (VoIP), file storage, file sharing, email, web conferencing, sales force automation, and CRM.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing the identification of relevant and targeted transactional features to embed within applications in order to improve click-through rate and capture an increased number of transactions, the method comprising:
   scanning by an application provider device without user intervention or input for stored data associated with a user of a web-based application;
   comparing by the application provider device the scanned stored data to a plurality of transactional features to determine when the stored data corresponds with a product or service offered through one of the transactional features, the one transactional feature comprising digital content identifying the product or service;
   enabling by the application provider device the one transactional feature without leaving the application only upon determining the stored data corresponds with the product or service offered through the one transactional feature, the enabling comprising displaying the one transactional feature on a display device and within the application;
   receiving by the application provider device at least one selection of one of one or more transaction options from the enabled transactional feature and determining when a transaction associated with the enabled transactional feature and corresponding to the one transaction option is completed without leaving the application; and
   receiving by the application provider device revenue in the form of an electronic payment for the completed transaction, providing at least a portion of the revenue via one or more communication networks to a source provider device associated with a provider of the product or service offered through the enabled transactional feature, and retaining at least a portion of the revenue, when the determining indicates that the transaction is completed.

2. The method as set forth in claim 1 further comprising receiving with the application provider device a selection of the transactional feature to display the one or more transaction options without leaving the application.

3. The method as set forth in claim 1 further comprising:
   identifying by the application provider device one or more transaction options which are each associated with a time and date;
   entering by the application provider device each of the identified one or more transaction options in a calendar application based on the associated time and date; and
   providing by the application provider device an indication if any of the identified one or more transaction options interferes with another appointment in the calendar application.

4. The method as set forth in claim 1 wherein the receiving revenue further comprises:
   retrieving financial data for the user of the application; and
   receiving the revenue from the user based on the retrieved financial data for the user of the application.

5. The method as set forth in claim 4 further comprising:
   determining by the application provider device when the financial data for the user of the application is stored;
   receiving by the application provider device at least one of existing financial data or new financial data from the user of the application when the determining indicates that the financial data for the user is not stored; and
   storing by the application provider device the at least one of received existing financial data or the new financial data for the retrieval of the financial data for the user of the application.

6. The method as set forth in claim 4 wherein the receiving the revenue further comprises capturing and retaining interest on the received revenue before the providing the portion of the received revenue to the provider of the product or service offered through the enabled transactional feature.

7. The method as set forth in claim 1 further comprising:
   receiving by the application provider device offers from two or more potential sources to be the provider of the product or service offered through the enabled transactional feature; and
   selecting by the application provider device one of the received offers to be the provider of the product or service offered through the enabled transactional feature based on at least one criteria.

8. The method as set forth in claim 7 wherein the at least one criteria is one of a lowest or a highest requested amount for the portion of the received revenue to the provider of the product or service offered through the enabled transactional feature.

9. The method as set forth in claim 1 further comprising recording by the application provider device a delivery date for the received at least one selection of one of one or more transaction options in a calendar application.

10. The method as set forth in claim 1 wherein the application is in a Web-based application.

11. The method as set forth in claim 1 wherein the application is a client-server application.

12. A non-transitory computer readable medium having stored thereon instructions for optimizing the identification of relevant and targeted transactional features to embed within applications in order to improve click-through rate and capture an increased number of transactions comprising machine executable code which when executed by at least one processor, causes the processor to perform steps comprising:
   scanning without user intervention or input for stored data associated with a user of a web-based application;
   comparing the scanned stored data to a plurality of transactional features to determine when the stored data corresponds with a product or service offered through one of the transactional features, the one transactional feature comprising digital content identifying the product or service;

enabling the one transactional feature without leaving the application only upon determining the stored data corresponds with the product or service offered through the one transactional feature, the enabling comprising displaying the one transactional feature on a display device and within the application;

receiving at least one selection of one of one or more transaction options from the enabled transactional feature and determining when a transaction associated with the enabled transactional feature and corresponding to the one transaction option is completed without leaving the application; and receiving revenue in the form of an electronic payment for the completed transaction, providing at least a portion of the revenue via one or more communication networks to a source provider device associated with a provider of the product or service offered through the enabled transactional feature, and retaining at least a portion of the revenue, when the determining indicates that the transaction is completed.

13. The medium as set forth in claim 12 further having stored thereon instructions comprising machine executable code which when executed by processor, causes the processor to perform steps further comprising receiving a selection of the transactional feature to display the one or more transaction options without leaving the application.

14. The medium as set forth in claim 12 further having stored thereon instructions comprising machine executable code which when executed by processor, causes the processor to perform steps further comprising:

identifying one or more transaction options which are each associated with a time and date;

entering each of the identified one or more transaction options in a calendar application based on the associated time and date; and providing an indication if any of the identified one or more transaction options interferes with another appointment in the calendar application.

15. The medium as set forth in claim 12 wherein the revenue further comprises:

retrieving financial data for the user of the application; and receiving the revenue from the user based on the retrieved financial data for the user of the application.

16. The medium as set forth in claim 15 further having stored thereon instructions comprising machine executable code which when executed by processor, causes the processor to perform steps further comprising:

determining when the financial data for the user of the application is stored;

receiving at least one of existing financial data or new financial data from the user of the application when the determining indicates the financial data for the user is not stored; and storing the at least one of received existing financial data or the new financial data for the retrieval of the financial data for the user of the application.

17. The medium as set forth in claim 15 wherein the receiving the revenue further comprises capturing and retaining interest on the received revenue before the providing the portion of the received revenue to the provider of the product or service offered through the enabled transactional feature.

18. The medium as set forth in claim 12 further having stored thereon instructions comprising machine executable code which when executed by processor, causes the processor to perform steps further comprising:

receiving offers from two or more potential sources to be the provider of the product or service offered through the enabled transactional feature; and selecting one of the received offers to be the provider of the product or service offered through the enabled transactional feature based on at least one criteria.

19. The medium as set forth in claim 18 wherein the at least one criteria is one of a lowest or a highest requested amount for the portion of the received revenue to the provider of the product or service offered through the enabled transactional feature.

20. The medium as set forth in claim 12 further having stored thereon instructions comprising machine executable code which when executed by processor, causes the processor to perform steps further comprising recording a delivery date for the received selection of one of one or more transaction options in a calendar application.

21. The medium as set forth in claim 12 wherein the application is in a Web-based application.

22. The medium as set forth in claim 12 wherein the application is a client-server application.

23. An application provider device comprising:

a processor coupled to a memory comprising programmed instructions stored in the memory, wherein the processor is configured to execute the programmed instructions stored in the memory to:

scan without user intervention or input for stored data associated with a user of a web-based application;

compare the scanned stored data to a plurality of transactional features to determine when the stored data corresponds with a product or service offered through one of the transactional features, the one transactional feature comprising digital content identifying the product or service;

enable the one transactional feature without leaving the application only upon determining the stored data corresponds with the product or service offered through the one transactional feature, and display the one transactional feature on a display device and within the application;

receive at least one selection of one of one or more transaction options from the enabled transactional feature and determine when a transaction associated with the enabled transactional feature and corresponding to the one transaction option is completed without leaving the application; and receive revenue in the form of an electronic payment for the completed transaction, provide at least a portion of the revenue via one or more communication networks to a source provider device associated with a provider of the product or service offered through the enabled transactional feature, and retain at least a portion of the revenue, when the determining indicates that the transaction is completed.

24. The device as set forth in claim 23 wherein the processor is further configured to execute the programmed instructions stored in the memory to receive a selection of the transactional feature to display the one or more transaction options without leaving the application.

25. The device as set forth in claim 23 wherein the processor is further configured to execute the programmed instructions stored in the memory to:

identify one or more transaction options which are each associated with a time and date;

enter each of the identified one or more transaction options in a calendar application based on the associated time and date; and provide an indication if any of the identified one or more transaction options interferes with another appointment in the calendar application.

26. The device as set forth in claim 23 wherein the processor is further configured to execute the programmed instructions stored in the memory to retrieve financial data for the user of the application and receive the revenue at the first source from the user for the selection based on the retrieved financial data for the user of the application.

27. The device as set forth in claim 26 wherein the processor is further configured to execute the programmed instructions stored in the memory to determine when the financial data for the user of the application is stored, receive at least one of existing financial data or new financial data from the user of the application when the determining indicates that the financial data for the user is not stored, and store the at least one of received existing financial data or the new financial data for the retrieval of the financial data for the user of the application.

28. The device as set forth in claim 26 wherein the processor is further configured to execute the programmed instructions stored in the memory to capture and retain interest on the received revenue at the first source before the portion of the received revenue is provided to the provider of the product or service offered through the enabled transactional feature.

29. The device as set forth in claim 23 wherein the processor is further configured to execute the programmed instructions stored in the memory to receive offers from two or more potential sources to provide the one or more transaction options and select one of the received offers to be the provider of the product or service offered through the enabled transactional feature based on at least one criteria.

30. The device as set forth in claim 29 wherein the at least one criteria is one of a lowest or a highest requested amount for the portion of the received revenue to the provider of the product or service offered through the enabled transactional feature.

31. The device as set forth in claim 23 wherein the processor is further configured to execute the programmed instructions stored in the memory to record a delivery date for the received at least one selection of one of one or more transaction options in a calendar application.

32. The device as set forth in claim 23 wherein the application is in a Web-based application.

33. The device as set forth in claim 23 wherein the application is a client-server application.

34. The method as set forth in claim 1, wherein a second source associated with the transactional feature is configured to pay the first source for every user of the application as compensation for having the transactional feature displayed in the application.

35. The medium as set forth in claim 12, wherein a second source associated with the transactional feature is configured to pay the first source for every user of the application as compensation for having the transactional feature displayed in the application.

36. The device as set forth in claim 23, wherein a second source associated with the transactional feature is configured to pay the first source for every user of the application as compensation for having the transactional feature displayed in the application.

* * * * *